United States Patent
Lukes et al.

(10) Patent No.: US 9,776,751 B2
(45) Date of Patent: Oct. 3, 2017

(54) CUP FEEDER

(71) Applicant: R.A Jones & Co., Covington, KY (US)

(72) Inventors: Matthew R. Lukes, Edgewood, KY (US); Jerome Brugger, Melbourne, KY (US)

(73) Assignee: R. A Jones & Co., Covington, KY (US)

( * ) Notice: Subject to any disclaimer, the term of this patent is extended or adjusted under 35 U.S.C. 154(b) by 0 days.

(21) Appl. No.: 15/005,154

(22) Filed: Jan. 25, 2016

(65) Prior Publication Data

US 2016/0137327 A1 May 19, 2016

Related U.S. Application Data

(62) Division of application No. 13/667,528, filed on Nov. 2, 2012, now Pat. No. 9,272,849.

(Continued)

(51) Int. Cl.
*B65G 47/24* (2006.01)
*B65B 35/36* (2006.01)
(Continued)

(52) U.S. Cl.
CPC .............. *B65B 35/36* (2013.01); *B65B 35/24* (2013.01); *B65B 35/243* (2013.01); *B65B 35/38* (2013.01);
(Continued)

(58) Field of Classification Search
CPC ....... B65B 35/24; B65B 35/243; B65B 35/38; B65B 35/58; B65B 35/56; B65B 35/36;
(Continued)

(56) References Cited

U.S. PATENT DOCUMENTS 3,108,682 A 10/1963 Zipper
3,253,694 A * 5/1966 Kinney ................ B65G 47/244
198/374

(Continued)

FOREIGN PATENT DOCUMENTS

DE 1963111 A1 11/1970
EP 1232969 A1 8/2002

OTHER PUBLICATIONS

International Searching Authority, Search Report and Written Opinion Issued in Corresponding International Application No. PCT/US2012/063550 dated May 15, 2014, 9 pages.

*Primary Examiner* — Mark A Deuble
(74) *Attorney, Agent, or Firm* — Wood Herron & Evans LLP

(57) ABSTRACT

A column of cups guided by their rims in elongated slots is spaced into desired cup pitch by one or more linear stars from which the cups can be transferred for packaging. The linear stars have lugs engaging and spacing the cups. In another aspect of the invention, cups are manipulated into patterns for final grouping and packaging and by a plurality of cup orienting pickers engaging, inverting and re-orienting the cups. In one final packaged cup group of two or more layers, alternating cups in each layer are inverted and a top lid of a cup in an upper layer is disposed on a top lid of a cup in a bottom layer, while a bottom of a cup in an upper layer is disposed on a bottom of a cup in a lower layer, and in an alternating pattern.

4 Claims, 23 Drawing Sheets

Related U.S. Application Data

(60) Provisional application No. 61/628,753, filed on Nov. 4, 2011.

(51) Int. Cl.

| | | |
|---|---|---|
| *B65G 15/14* | (2006.01) | |
| *B65B 35/24* | (2006.01) | |
| *B65G 47/28* | (2006.01) | |
| *B65G 47/244* | (2006.01) | |
| *B65G 47/252* | (2006.01) | |
| *B65G 47/08* | (2006.01) | |
| *B65B 35/38* | (2006.01) | |
| *B65B 35/58* | (2006.01) | |
| *B65B 35/56* | (2006.01) | |

(52) U.S. Cl.
CPC .............. *B65B 35/56* (2013.01); *B65B 35/58* (2013.01); *B65G 15/14* (2013.01); *B65G 47/084* (2013.01); *B65G 47/244* (2013.01); *B65G 47/252* (2013.01); *B65G 47/28* (2013.01); *B65G 2201/0244* (2013.01)

(58) Field of Classification Search
CPC  B65G 15/14; B65G 47/28; B65G 2201/0244; B65G 47/084; B65G 47/086; B65G 47/088; B65G 47/24; B65G 47/244; B65G 47/248; B65G 47/252
See application file for complete search history.

(56) References Cited

U.S. PATENT DOCUMENTS

| | | | | |
|---|---|---|---|---|
| 4,002,005 | A * | 1/1977 | Mueller | B65B 9/02 53/143 |
| 4,064,987 | A | 12/1977 | Rowan | |
| 4,067,433 | A * | 1/1978 | Phipps | B65B 35/56 198/374 |
| 4,095,390 | A | 6/1978 | Knudsen | |
| 4,227,606 | A | 10/1980 | Bogatzki | |
| 4,800,704 | A * | 1/1989 | Ishii | B65B 25/04 198/458 |
| 5,250,008 | A | 10/1993 | Lange | |
| 5,267,590 | A * | 12/1993 | Pringle | B08B 1/00 141/1 |
| 5,353,908 | A | 10/1994 | Wihlidal | |
| 5,785,169 | A | 7/1998 | Egger | |
| 6,360,873 | B1 | 3/2002 | Bonnain et al. | |
| 7,803,232 | B2 | 9/2010 | Avelis et al. | |
| 8,588,960 | B1 * | 11/2013 | Nitulescu | B65B 57/10 700/218 |
| 9,650,212 | B2 * | 5/2017 | Sassi | B65G 47/248 |
| 2007/0059152 | A1 * | 3/2007 | Cottone | B65G 47/90 414/788.2 |
| 2015/0231788 | A1 * | 8/2015 | Subotincic | B25J 15/0616 414/800 |
| 2016/0214802 | A1 * | 7/2016 | De Block | B65G 47/248 |

\* cited by examiner

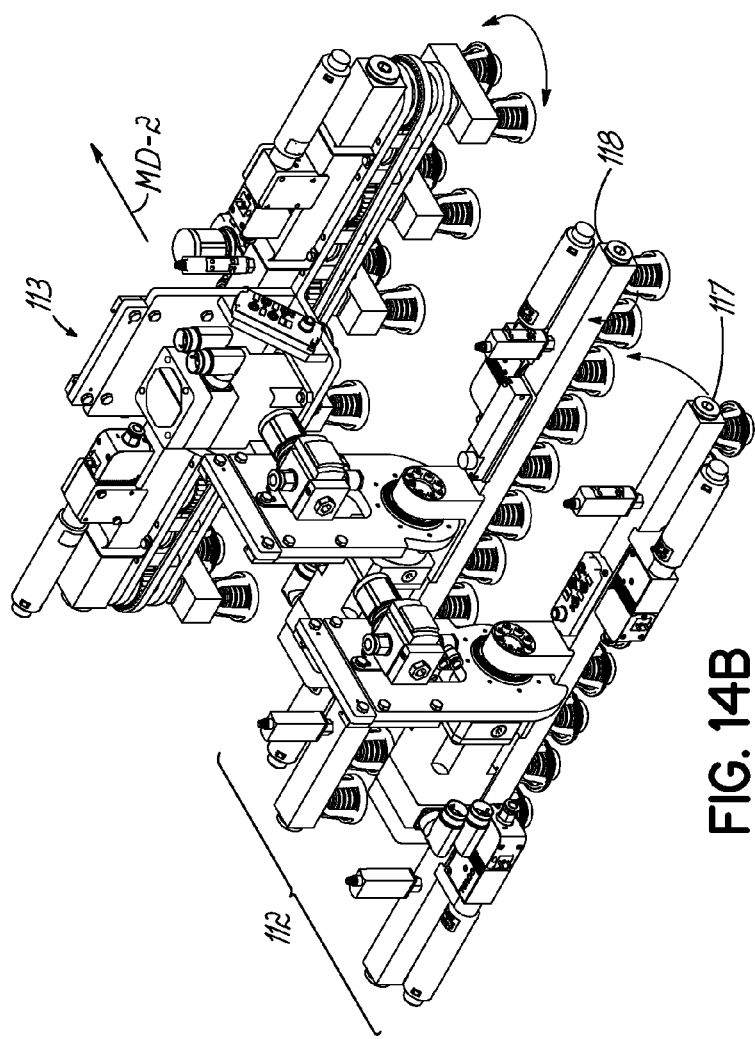
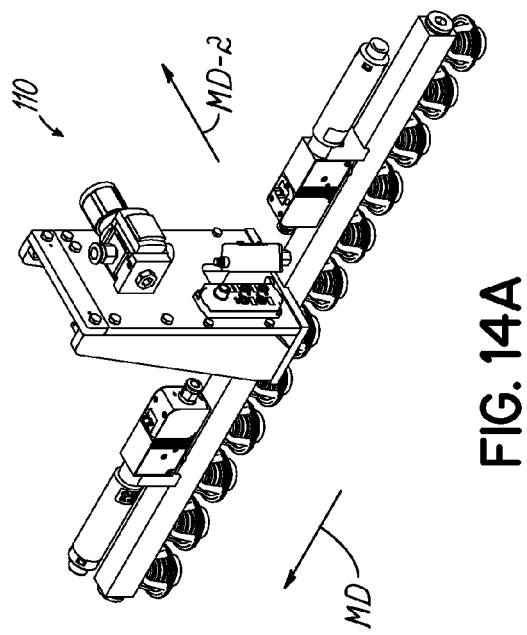
FIG. 14B
FIG. 14A

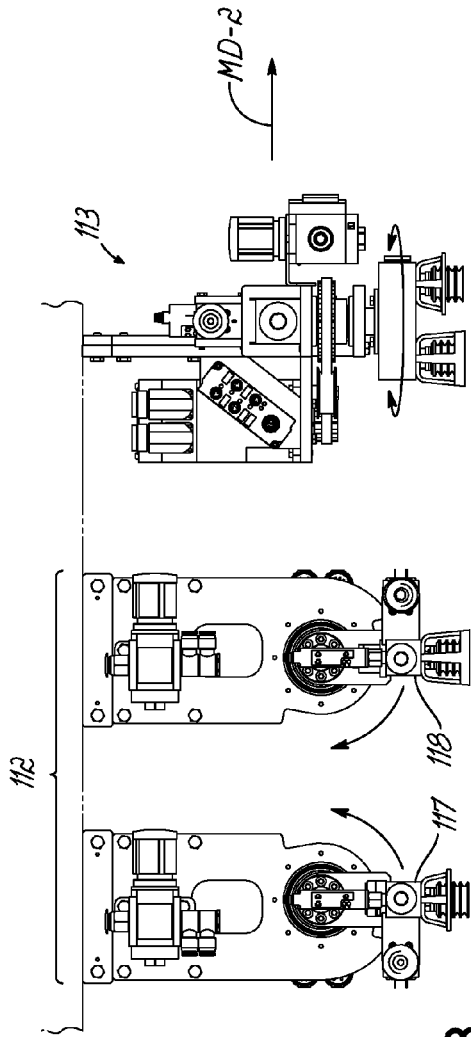
FIG. 16A
FIG. 16B
FIG. 16C

CUP FEEDER

RELATED APPLICATION

This application is a divisional of U.S. Ser. No. 13/667,528, filed Nov. 2, 2012, now allowed on Sep. 29, 2015 and will issue on Mar. 1, 2016 as U.S. Pat. No. 9,272,849. Priority of said application U.S. Ser. No. 13/667,528, filed Nov. 2, 2012 is claimed as well as priority of U.S. Provisional application Ser. No. 61/628,753, filed Nov. 4, 2011, which is claimed. Both said applications are herewith incorporated by reference.

FIELD OF THE INVENTION

This invention relates to cup feeding and more particularly to the transfer of individual cups, such as, for example, single-serve cups used in brewing single cups of coffee, from a randomly-fed orientation, both toward and into cartons for packaging, transport and sale.

BACKGROUND OF THE INVENTION

Cups for single serve coffee brewing, for example, are formed, filled and sealed and presented in random volume and mixed orientation from forming and filling machines. Typically, such cups are accumulated in random batches and are fed from a feeder drum or bowl into a lid-up, single file line for packaging.

Such cups may vary, at least slightly in shape, in weight and in overall height, depending on whether the typical foil lid or cover outwardly bulges or is somewhat sunken below the cup rim. Generally the cups are slightly tapered from a wider, rounded cross-section at their upper end or mouth at the rim to a narrower rounded cross-section at their bottom ends. The inwardly tapering cup walls from top to bottom may be straight or may have circumferential rings or steps surrounding the upper cup end. Internally, the cups typically contain a filter disposed midway up the cup with coffee between the filter and the upper end or lid. The bottom portion of the cup may define an empty "brew chamber", such that the cup is somewhat top heavy. Depending on construction, a top lid is usually adhesively applied to a radially extending lip or rim extending as a radial flange around the open mouth of the cup. Such lid may bulge outwardly (upwardly) or it may slightly sink below the rim. The cup bottom may be flat, or it too may slightly bulge outwardly, depending on its design and the forming, filling process. As a result, any handling structure downstream of the feeder bowl must be adjustable to handle such cups of a large variety of external shapes, weight and top heaviness, depending on fill.

In a line of cups, guided in a single lane where one cup engages a preceding cup and, in turn, is engaged by a following cup, the cups may not be transported uniformly. For example, if a top guide is adjusted down to engage a sunken cup lid, it may not pass cups with bulging top lids and which hangs up or causes voids in the line of feeding cups, resulting in downstream packaging aberrations, waste, etc. Adjustment of such guides, etc. for cups of different configuration is thus required, takes time and reduces through-put rates when changes are required.

If a handling or guiding system is not "tuned" to a particular cup parameter, cups of even slightly different parameters may upset, fall over or otherwise jam up the feeder once the cups are placed in single file. This results in a high rate of rejection (or lower rate of operational efficiency).

The desire then is to provide apparatus for transferring cups having varied parameters with universal efficiency and comparatively low rejection rates, even when handling cups having a variety of the aforementioned variances.

In addition, the cups are typically presented for cartoning in a line with the cups abutting. For packaging, the cups are typically spaced apart for handling in the packaging process. This is typically accomplished, for example, by one or more timing screws which operate to space the cups apart. These screws are typically configured to the cup shape where handling different cups require a change in the screw.

In handling cups for packaging, it is also desirable to place them into cartons for shipping, transportation and display at the point of sale with as many cups as possible oriented in the given interior volume of any carton. Proper orientation can result in the smallest carton possible for the desired number of cups therein.

Accordingly, it is also desired to reliably orient cups for carton packaging in desired formation but at high speeds and reliable cup through-put.

SUMMARY OF THE INVENTION

In part, this invention is a function of applicant's observation that of all the typical cup variations, one constant in cup configuration appears to be the thickness of the cup lip or rim and the lid adhered thereto at the circumference of the upper cup end, as well as the diameter of the outer edge of the rim. According to the invention, the rim is received in elongated slots of elongated guides at the downstream end of the feeding line of cups. The cup rims are captured in these guide slots on either side of the rim, extending along the machine direction at each side of the cup and are each held securely as the cups move along downstream, with rims abutting.

As the cups are moved by an underlying conveyor, such as a belt or table top conveyor, they are moved into a spacing apparatus. Preferably, for a single line of advancing cups, the spacing apparatus comprises two conveyors having opposing runs capturing the cups therebetween and spacing them into a desired pitch, such as at 2.5 inches, for example. Each opposed conveyor run of each conveyor includes a series of cup-engaging lugs, each lug formed to define, with an opposed lug, both a final cup-receiving pocket and an inclined ramp for engaging and directing an individual cup from a line of cups into the so-formed pocket. As such, the ramp serves to separate a leading cup from a following cup by a predetermined pitch distance, urging it into a moving pocket formed by the opposed conveyor lugs and slightly decelerating or retarding the velocity of the following line of cups as the cups are spaced.

Once a set number (such as 12, for example) of separated cups at the selected pitch are formed in the spacing means or apparatus, an end effector of a robot engages the cup tops, lifts them from the spacing apparatus and deposits them, perpendicularly or transversely to the machine direction of the spacing means, bottom down, into a plurality of moveable trays, each having spaced, cup-receiving pockets in two parallel transverse rows.

As the trays move, an orienting apparatus engages cups in every other row, inverts them and re-deposits them into the same row so every other row of cups is now placed in the moving pockets tray with tops down. Preferably, the trays continue to move in a machine direction while the cups are lifted inverted, then re-deposited.

Thereafter, a shiftable and rotatable re-orienting apparatus engages two cups at similar locations in adjacent transverse rows of the tray and turns them, such that the cups are in the transverse tray rows with each other cup oriented opposite the adjacent cup; thus one bottom down and one bottom up. The trays index in a machine direction between operation of this apparatus so that cups in advancing transverse row pairs are in opposite positions from adjacent row pairs.

Subsequent picking apparatus engages a pattern of these cups and deposits them in a layer on a loading conveyor, now moving in a direction parallel but opposite to the machine direction of the spacing means, for ultimate grouping and placing in a container.

Preferably, the container configuration includes one layer of cups, such as a layer with six cups, with adjacent cups in both directions disposed alternately; one bottom down and the next bottom up. A final picking apparatus picks up and lays on top of these another layer of cups having a pattern such that one cup is stacked on another, either with the cup bottoms engaging or the cup tops engaging.

The various cup orienting manipulations are preferably carried out by articulated end effectors or "pickers" operating and cooperating to arrange the cups, through various stages in the desired configurations.

Throughout, the cups are positively-controlled. The initial spacing of the cups is carried out in a positive manner, without the use of any timing screws and with control of the cups in whatever configuration. Since the guides cooperate to engage the cups consistently, cup shapes, cups of varying weight and the like, and cups with varying lid configurations do not require new guide placement or guide adjustment and a variety of cup sizes, shapes weights and lids can be reliably handled even at the relatively high speeds desired, without an increase and at a very low rejection rate.

As a result of the use of the entire apparatus, a single line of top up, abutting cups are configured for compact packaging in layers with alternating cups in each layer oriented oppositely.

It will be appreciated that the invention thus comprises several handling systems and mechanisms which are uniquely combined here, but which are separable. For example the line spacing apparatus could be used with other equipment for correlating cups for packaging, and the orienting systems used to correlate spaced cups in a line no matter how formed. Advantages are attained by each system independently and, when used together, the end result is also advantageously provided. A variety of final cup patterns for grouping and packaging can be produced.

BRIEF DESCRIPTION OF THE DRAWINGS

FIG. 7 showing the cups with rims omitted for clarity;

FIGS. 14A, 14B and 14C are an isometric diagrammatic views of a plurality of pickers or end effectors for orienting and/or transporting cups as rows of cups are moved;

FIGS. 16A, 16B and 16C are elevational views of the components of FIGS. 15A, 15B and 15C;

DETAILED DESCRIPTION OF THE INVENTION

Cup Pitch:

Turning now to the drawings, FIGS. 1-8 illustrate a preferred embodiment of the cup spacing apparatus of the invention. While the term "cup" is used herein, it will be appreciated the invention relate to the handling of containers which, here, are referred to particularly and preferably as "cups" as described, having rims as shown.

Figure 1:
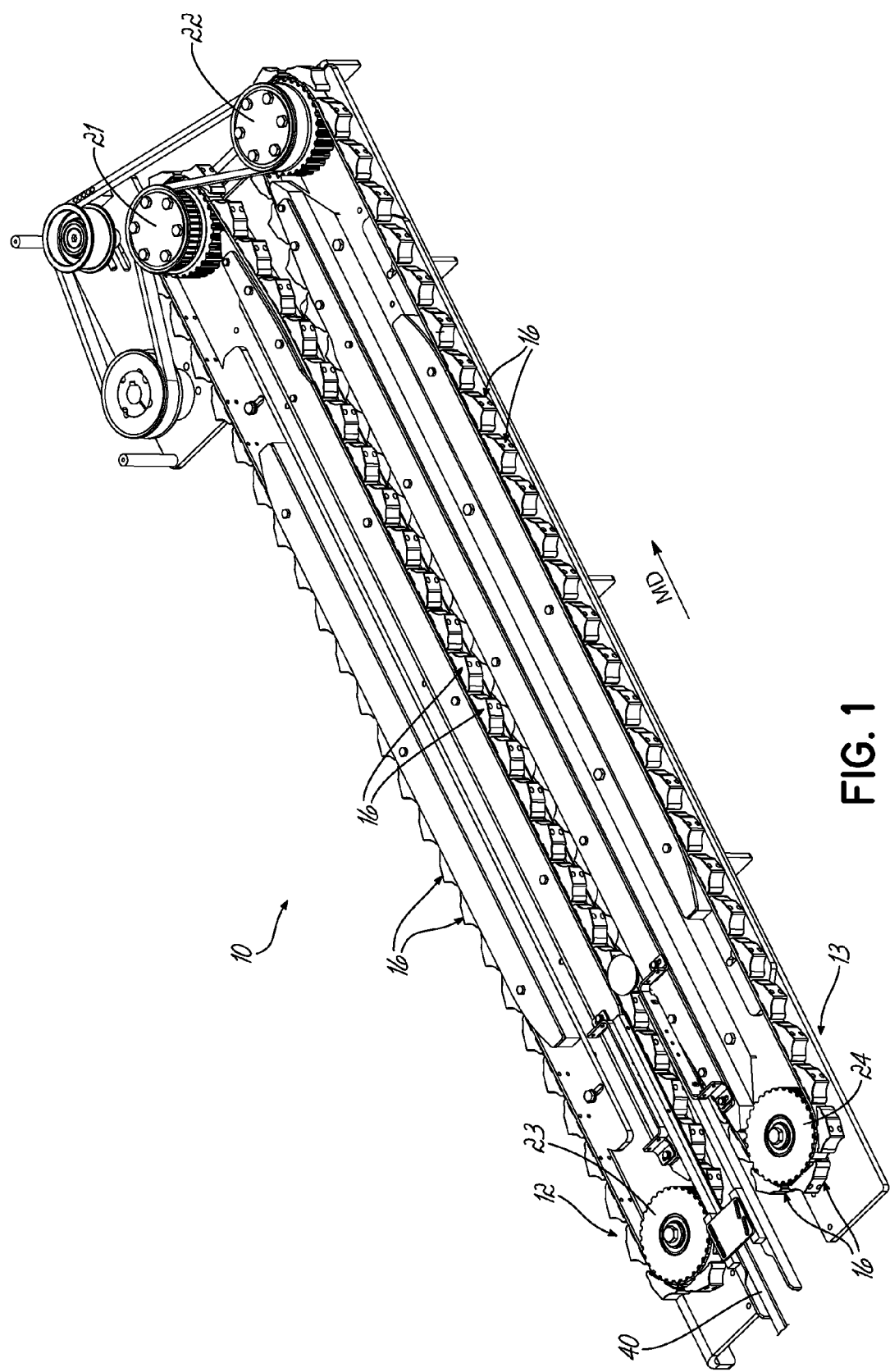
FIG. 1 is an isometric view of a cup spacing apparatus according to the invention for receiving a single line of abutting cups and spacing them in a single line at predetermined pitch.

In FIG. 1, cups (not shown) enter the spacing apparatus 10 from the left end and are conveyed by conveyor 11 between two linear stars, comprising conveyors 12, 13 having opposed, elongated operative runs 14, 15 (FIG. 2) operating in a downstream machine direction MD, transporting cups along a cup path having an elongated center line extending between conveyors 12, 13.

Conveyors 12, 13 each comprise a series of lugs 16 carried on a flexible member or belt 17 backed up by a respective elongated guide 18, 19, respectively. The opposed runs 14, 15 are inclined toward one another (tapered respectively inward) at the left-hand entry end of the apparatus 10 to receive the cups as the opposed lugs move both downstream and together.

Drive sprockets 21, 22 and idler sprockets 23, 24 carry belts 17 and lugs 16 in the machine direction.

As seen in the FIGS., each lug includes a curved pocket defining leading surface 26 and a trailing ramp surface 27, inclined away from a center-line of the cup path toward the pocket surface 26.

Figure 2:
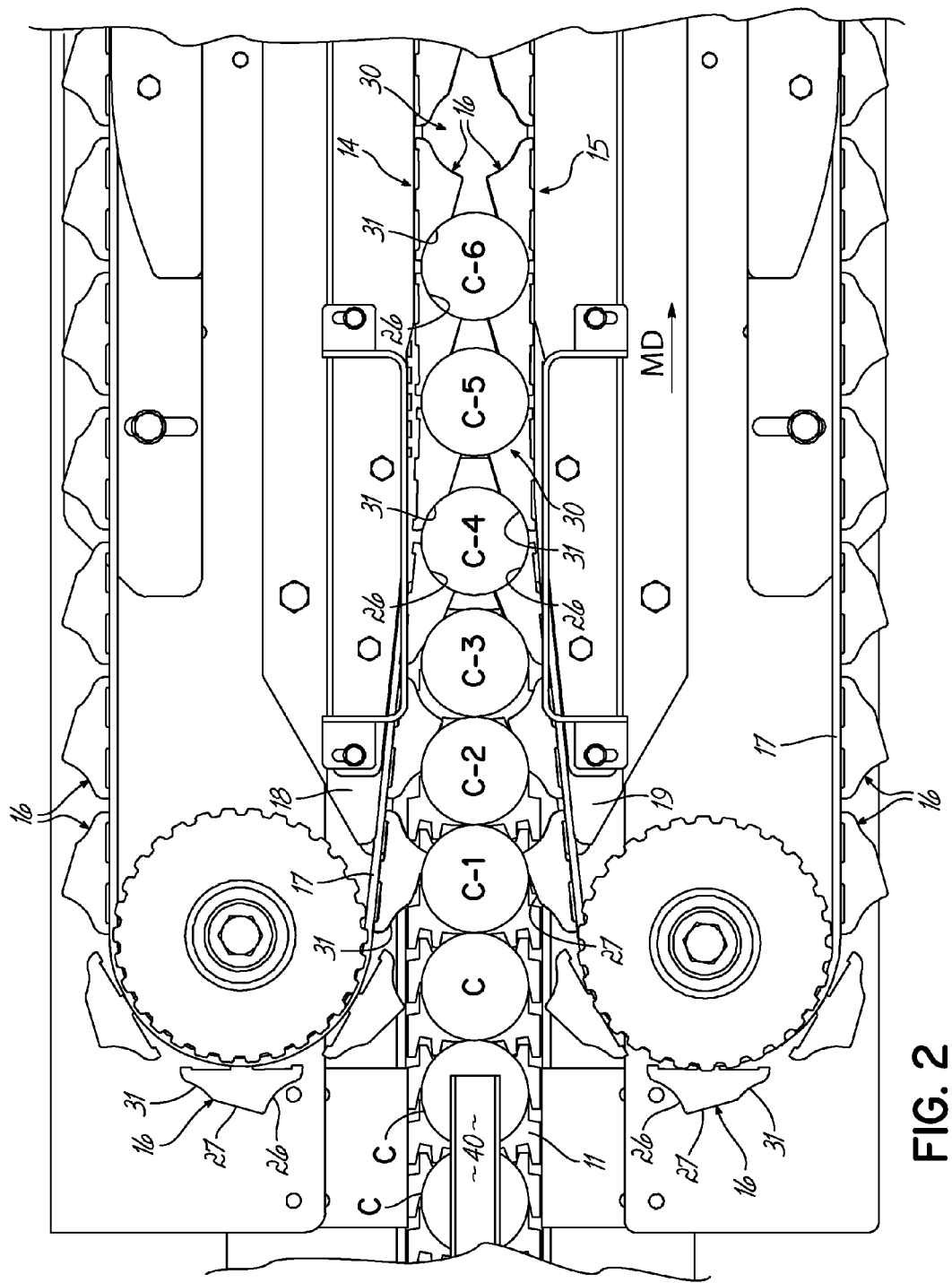
FIG. 2 is a top plan view of the upstream end of a spacing apparatus of FIG. 1.
Figure 3:
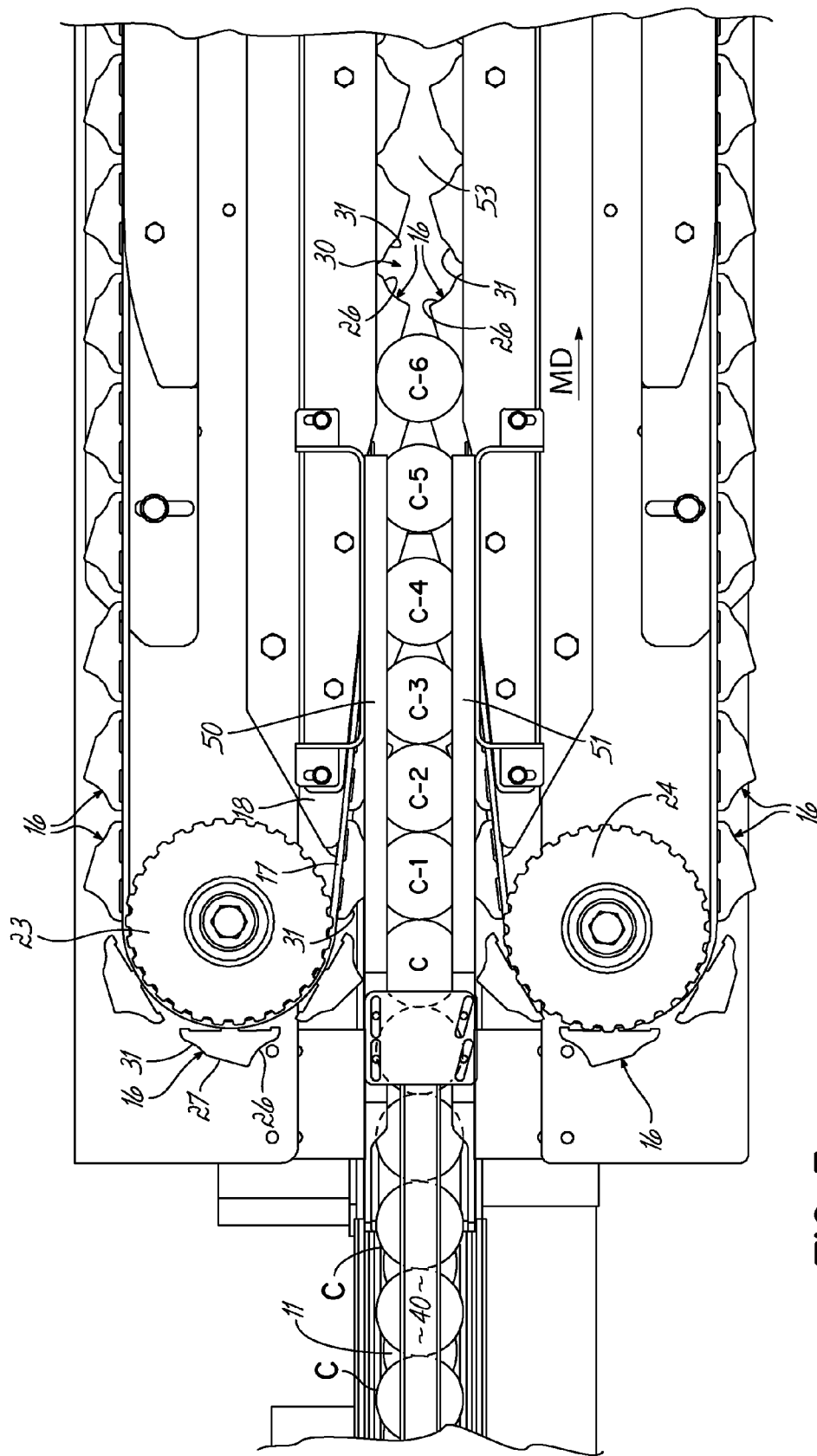
FIG. 3 is a top plan view as in FIG. 2 but slightly lengthened to illustrate details.
Figure 4:
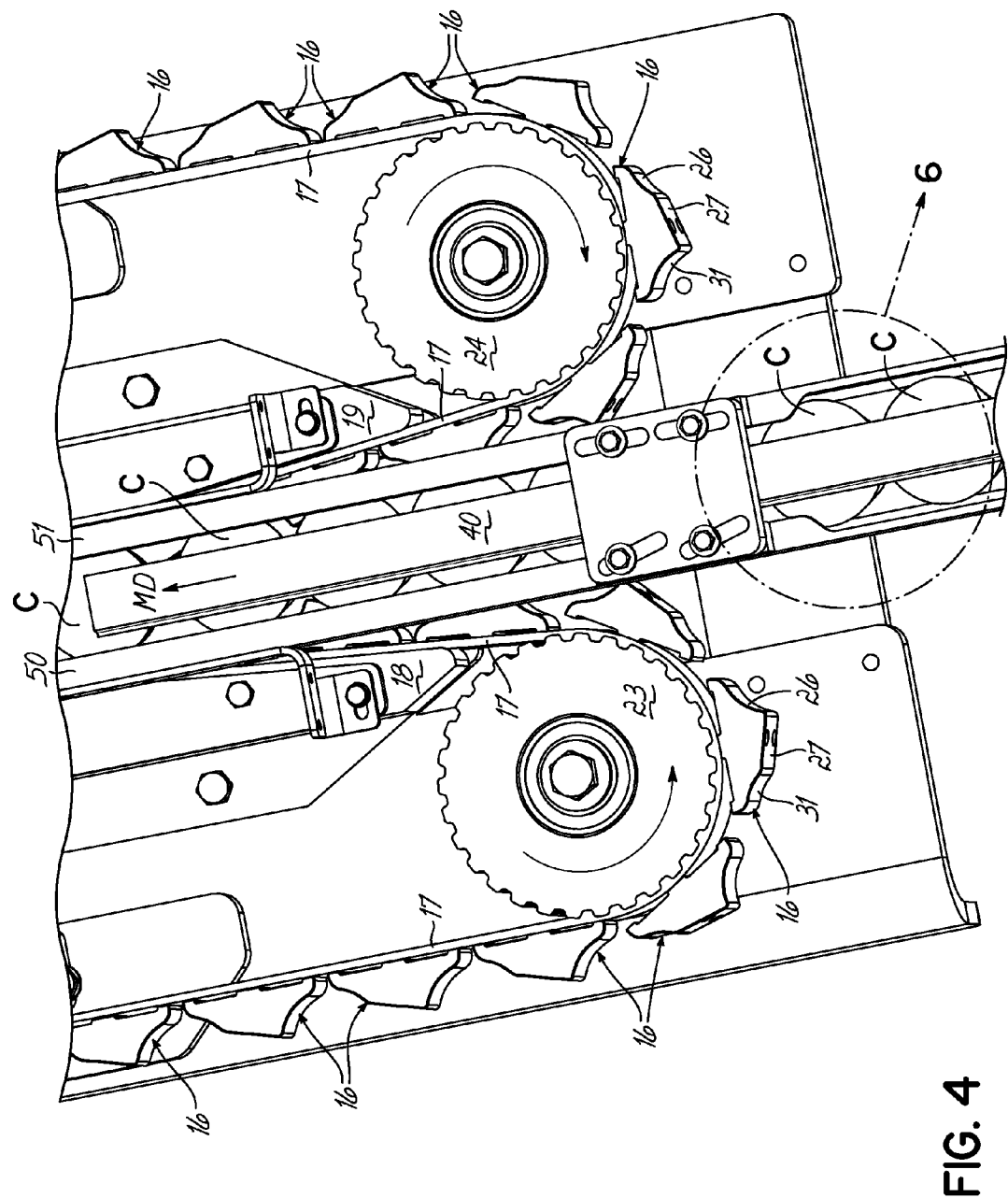
FIG. 4 is a top perspective view similar to FIG. 2 of an actual spacing apparatus as described and illustrated in FIGS. 1-3.
Figure 5:
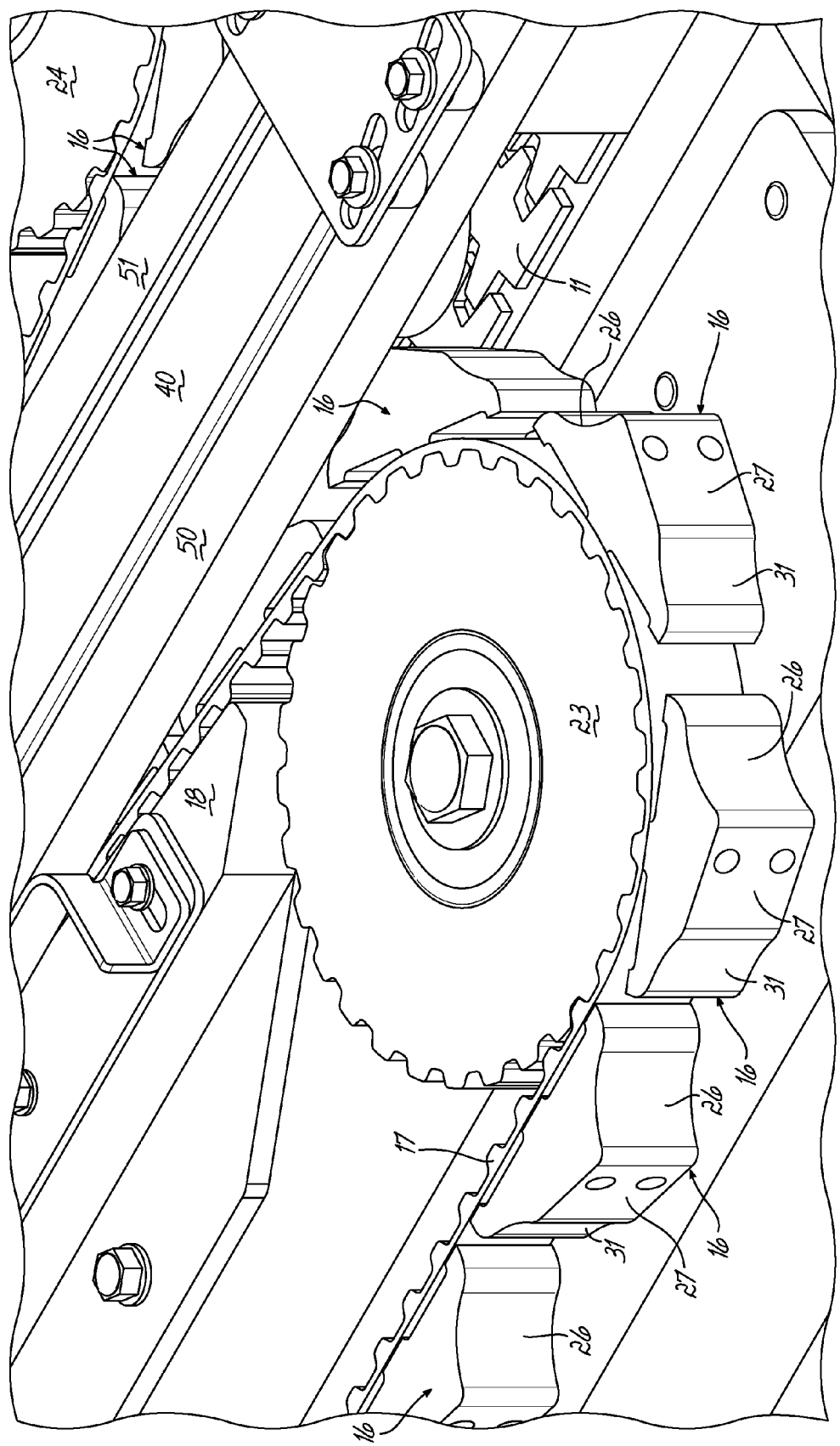
FIG. 5 is a perspective view of an upstream end of one of the linear stars of the spacing apparatus of FIG. 4.
Figure 6:
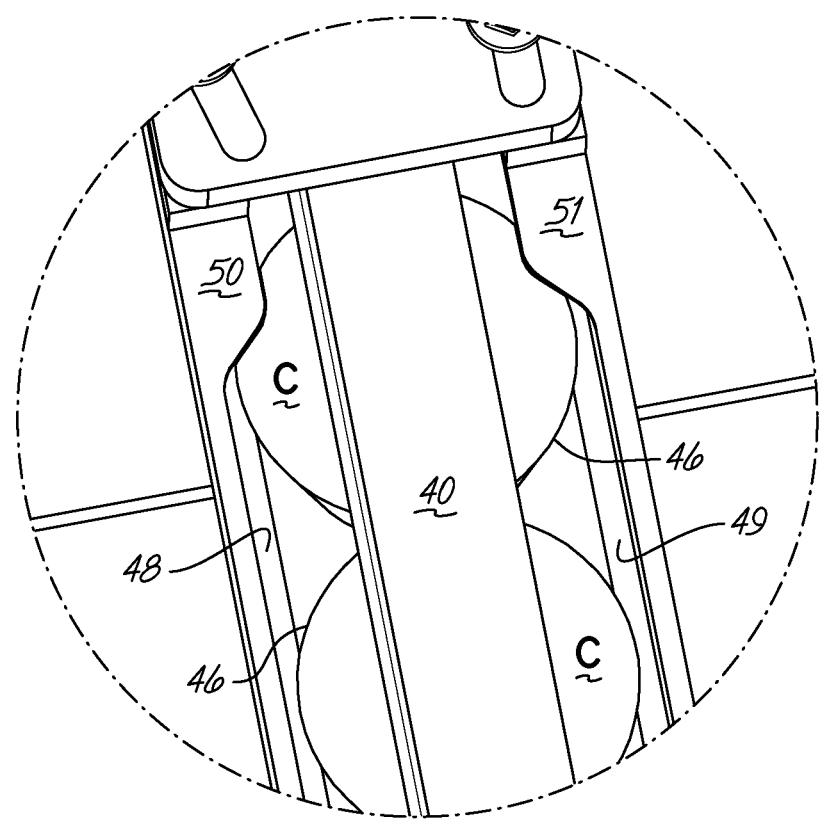
FIG. 6 is a an enlarged view of encircled area 6 in FIG. 4, showing lid up, abutting cups approaching the spacing apparatus of FIGS. 1-5.

The pocket defining surfaces 26 of the opposing lugs, along with pocket-defining surfaces 31 of next adjacent lugs, and the like surfaces of opposing lugs, together define cup-receiving pockets 30 (see FIG. 2).

In brief explanation of operation of opposed lugs 16 on the advancing cups, and with reference to FIG. 2, the cups C are in a single lane in abutting "prime" orientation, conveyed toward the opposed conveyor runs 14, 15. FIG. 2 illustrates the cups as abutting in a "prime" area just upstream of conveyors 12, 13. The cups in "prime" could be pre-spaced.

A cup C-1 is first engaged by opposed ramp surfaces 27 of a first set of opposed lugs 16. While the cups are continuously conveyed in the direction MD, the velocity of the cups C-1, C-2 is retarded or diminished slightly and the cups C-1, C-2 move relatively down ramp surfaces 27 toward trailing surfaces 31. As the cups and the lugs 16 progress in the downstream direction MD, the cup C-3 is engaged by pocket surfaces 31 of leading lugs 16 with the cup C-4 also engaged by the opposed pocket forming surfaces 26 of a following set of lugs 16. Accordingly, as shown in the FIGS., the linear stars separate the abutting cups from the upstream "prime" area into the pockets 30 at a predetermined pitch.

In FIG. 2 then, cups C-5, C-6 and downstream cups are spaced apart at the desired pitch formed by the lugs 16. Capture of cups C-1 to C-6 is thus continuous, even though the velocity of the cups being engaged by the linear stars may not be constant, while that of the lugs is.

More particularly, the cups are "wedged" by the approaching lugs 16 of the respective conveyors 12, 13 as shown in the FIGS. into the spaced pockets 30.

The cups are preferably held down on their conveyor 11 upstream of the linear stars by a top guide 40, adjusted to accommodate cups with a variety of lids. In more detail, the cups C have an inwardly-tapering, depending cylindrical wall 44 (FIG. 8) with a wider circular upper mouth 45 defined by a radially extending rim, lip or flange 46, to which is preferably glued a lid 47. Rim 46 is captured in slots 48, 49 defined in elongated guides 50, 51. This engagement supports and stabilizes the cups C as they move in the direction MD.

A dead plate 53 may be used at the end of conveyor 11 as the cups C are then driven by the linear stars.

Figure 7:
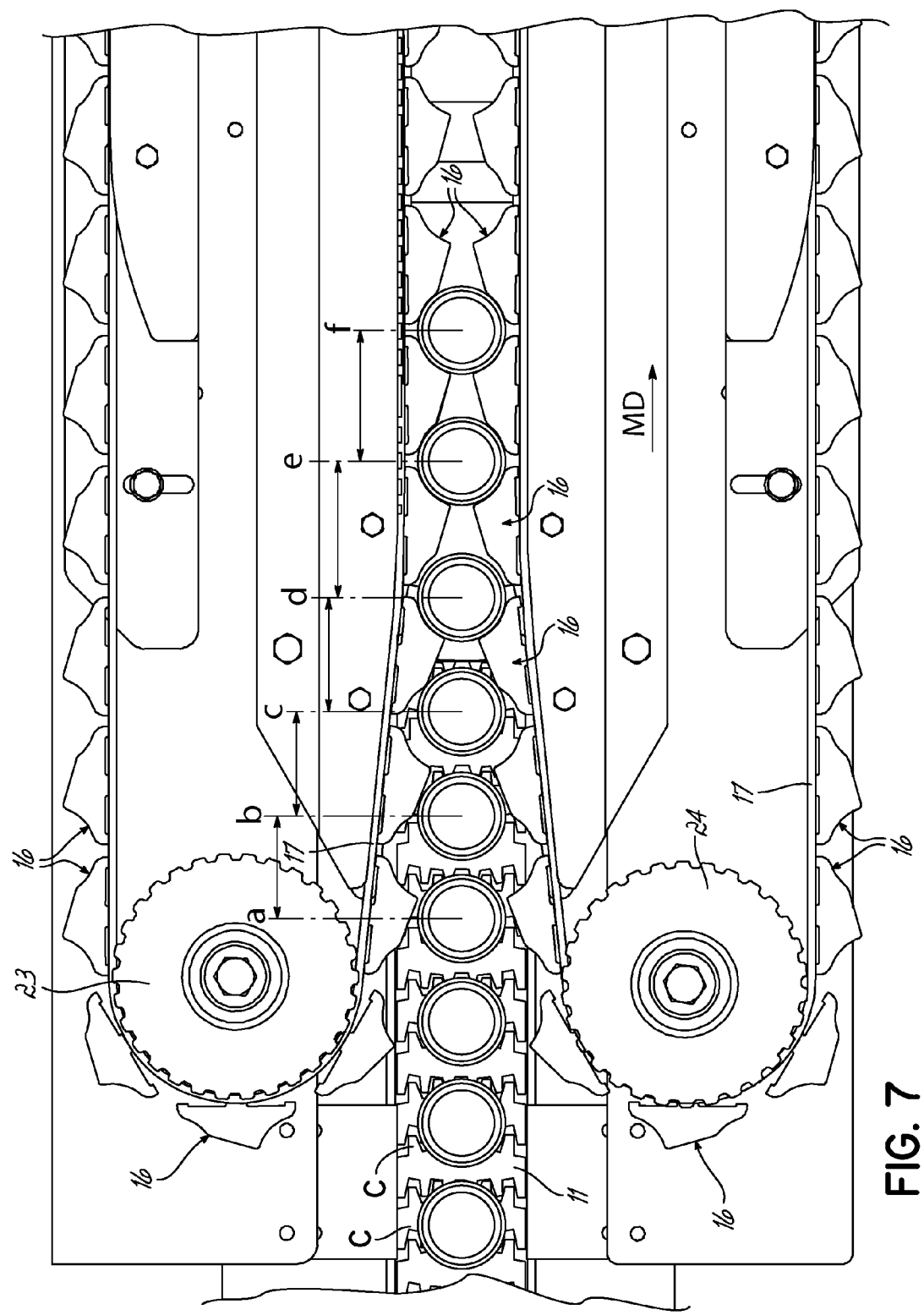
FIG. 7 is a plan view similar to FIGS. 2 and 3 but illustrating the pitch changes of the cups as they are moved into final fixed pitch position.
Figure 8:
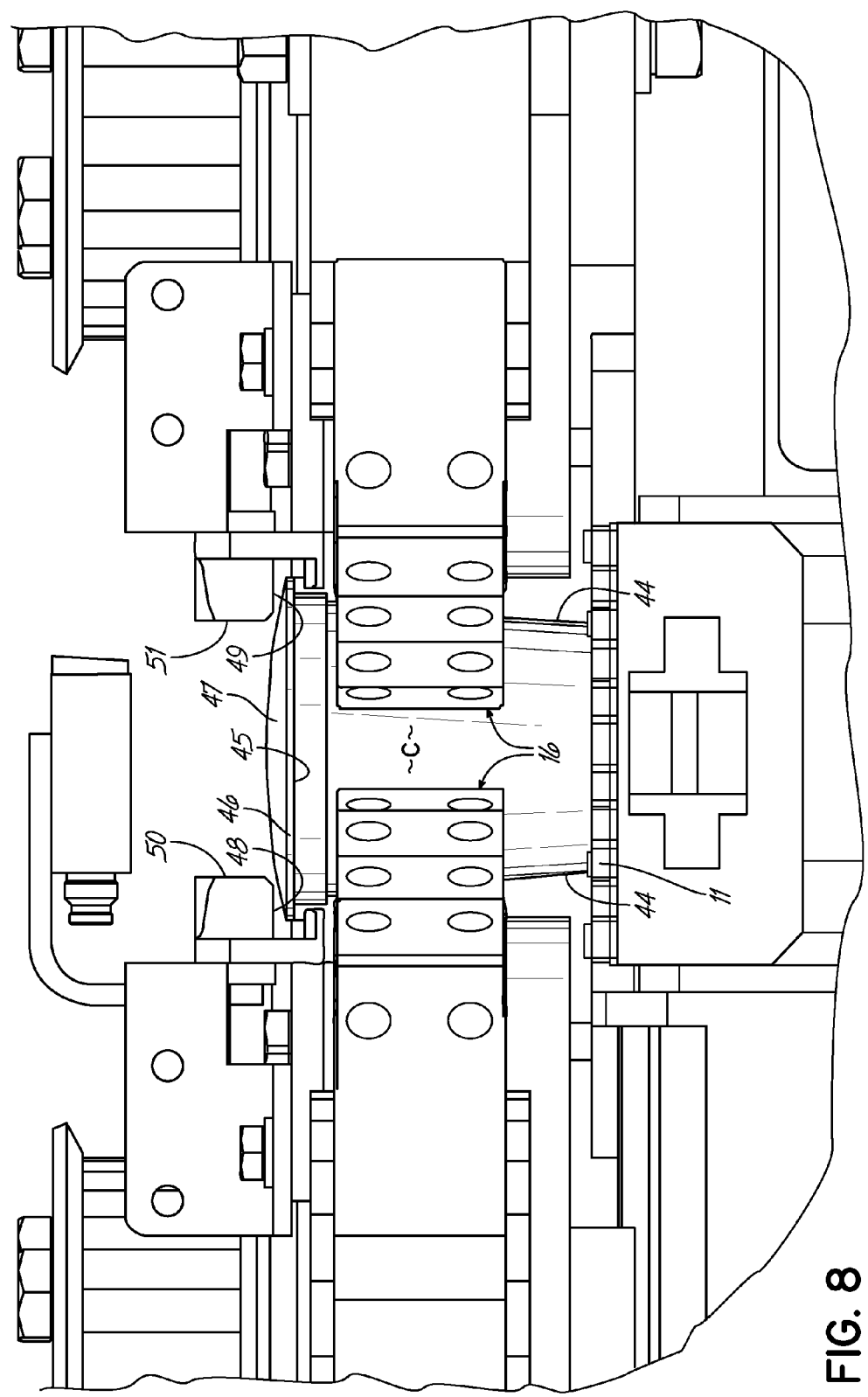
FIG. 8 is an end view of a conveyed cup captured in rim guides as the cups are introduced into the spacing apparatus.

Various pitch changes in distance between the cups are illustrated in FIG. 7 (here the elongated guides 50, 51 (FIGS. 3, 7) are removed for clarity).

In FIG. 7, only the bodies, and not the rims of cup C are illustrated for clarity. The distance a to b represents the starting distance between the cups C when their rims abut. The distance b to c represents an initial slight decrease in distance compared to distance a to b as the cups are first engaged by ramps 27. The distance c to d represents the cups moving into pockets 30, while distance d to e represents further spacing as the cups move finally into the closing pockets 30 and the distance e to f represents the final spacing pitch between each cup. Accordingly, the spaced distance e to f is greater than the distance a to b.

Finally, it will be appreciated that the cups could be spaced by a single linear star conveyor on one side of the cups which are slidingly supported by an elongated backup guide on their opposite side, however, the dual opposed linear stars perform well in conjunction.

The term "linear star" is an arbitrary term used by applicant with respect to the spacing apparatus disclosed and whose function is somewhat equivalent to a rotating star wheel used to engage between cylindrical objects and to space them apart. In this content, the linear stars disclosed herein can be of indefinite length in an elongated space, providing many spaces or "sites" or pockets for cups at predetermined pitch and without a huge size increase in a rotary star to provide an equivalent circumferential distance to hold a larger number of cups, such as 12, at desired pitched distance.

With more particularity, it will be appreciated that the lugs 16 of each lug conveyor thus comprise a curved leading surface 26 forming a "backside" of a cup receiving pocket 30. A ramp 27 of each lug 16 tapers away or rearwardly from an inward-most end of surface 26 toward a trailing surface 31 of each lug. Trailing surface 31 of each lug forms, together with a curved surface 26 of a following lug, a single cup pocket 30.

Thus, the ramps 27 taper outwardly, with respect to the cup path in which they move, in direction MD from the inward edge of surface 26 outwardly to the inward edge of surface 31. Inward-most edge of surface 26 of each lug 16 extends further into the path of cups C than the inward-most edge of surface 31.

In other words the lugs 16 have an inwardly-directed peak at the juncture of surfaces 26 and ramp 27 and a peak of lesser height at the junction of ramp 27 and surface 31.

With this construction, the inward-most extension of ramp 27 with respect to the cup path illustrated in the FIGS. is functional to engage between the cups fed from their abutted "prime" status and to wedge or retard the cups rearwardly (with respect to the direction MD), toward the forming pockets 30 at predetermined pitch. The cups are thus "wedged" by the converging ramps of respective lugs 16 of the two lug conveyors, or by the ramp 27 of a lug 16 converging with an opposed guide, into a cup pocket 30 as the lugs move downstream in continuous motion.

Figure 9:
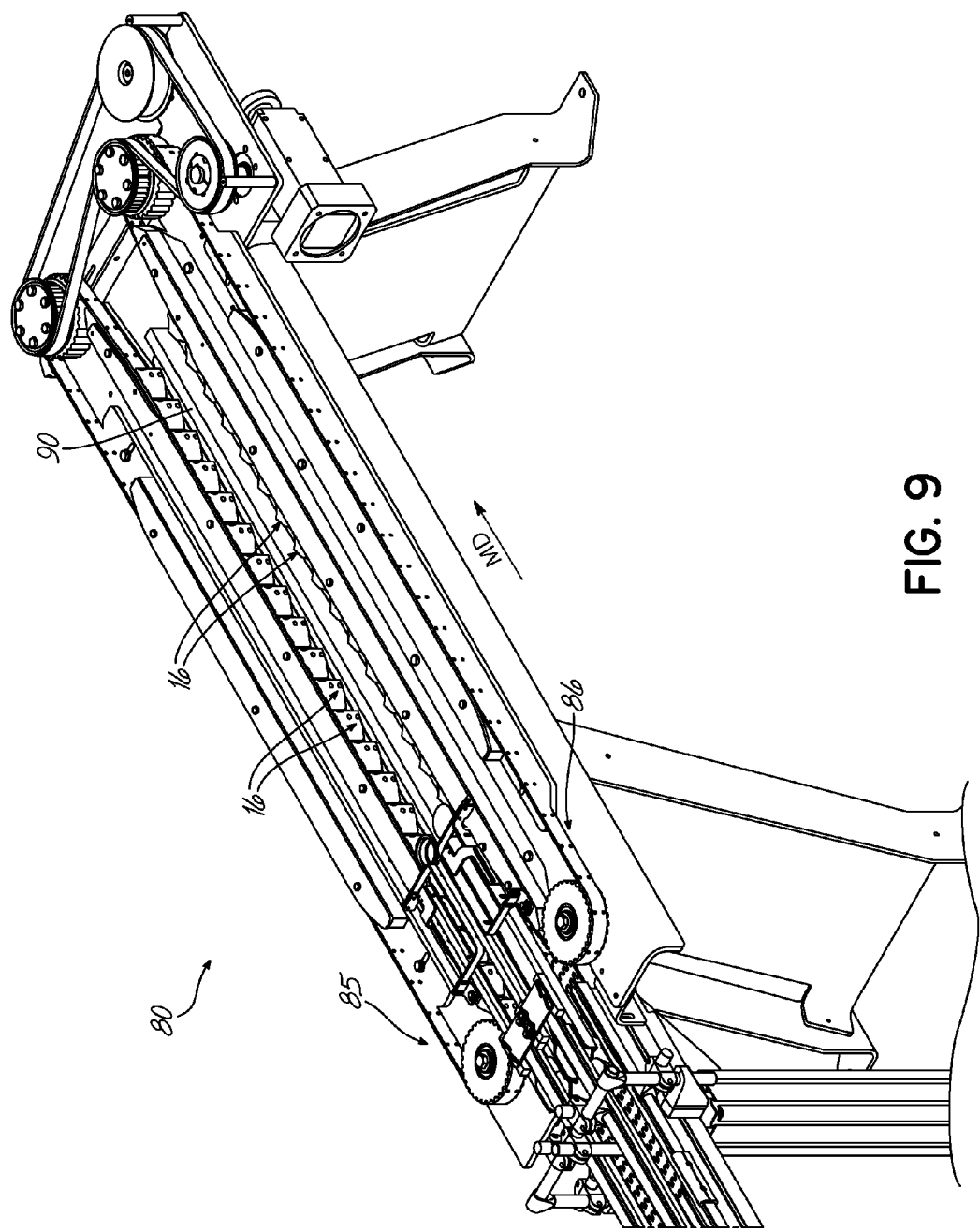
FIG. 9 is an isometric view of an alternative embodiment dual lane spacing apparatus.
Figure 10:
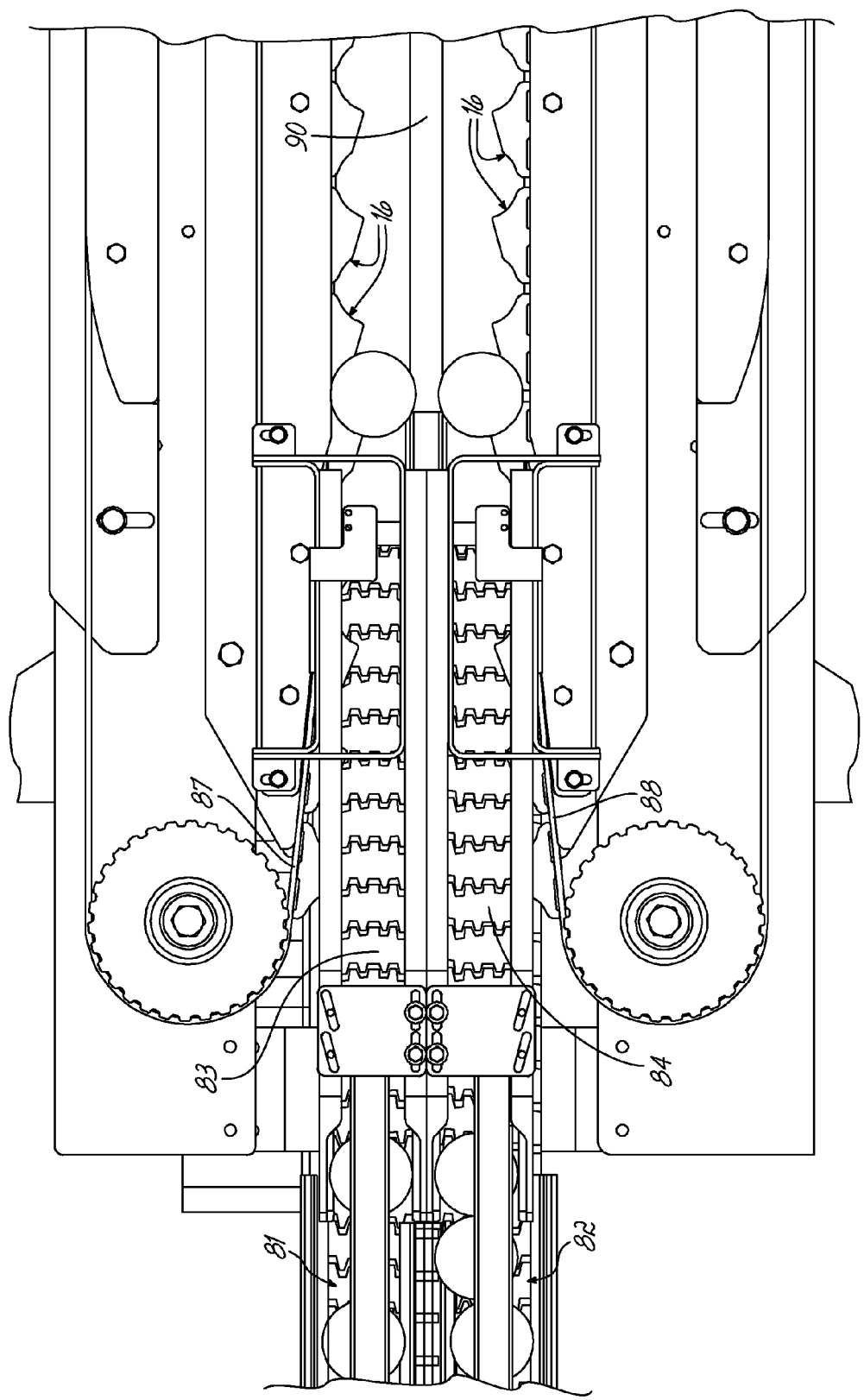
FIG. 10 is a top plan view of the invention in FIG. 9.
Figure 11:
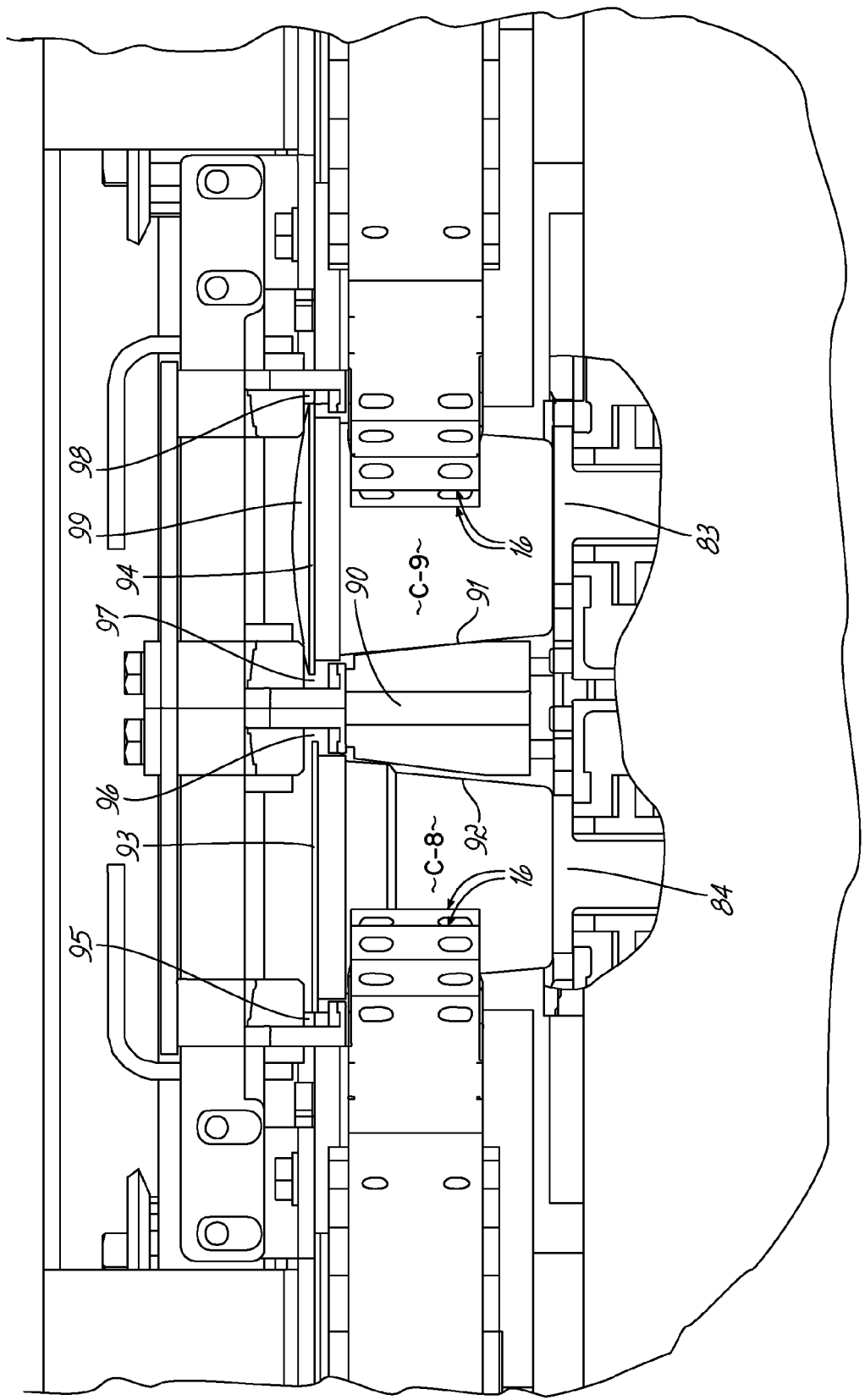
FIG. 11 is an end view of FIG. 9 showing cups in dual lanes.
Figure 12:
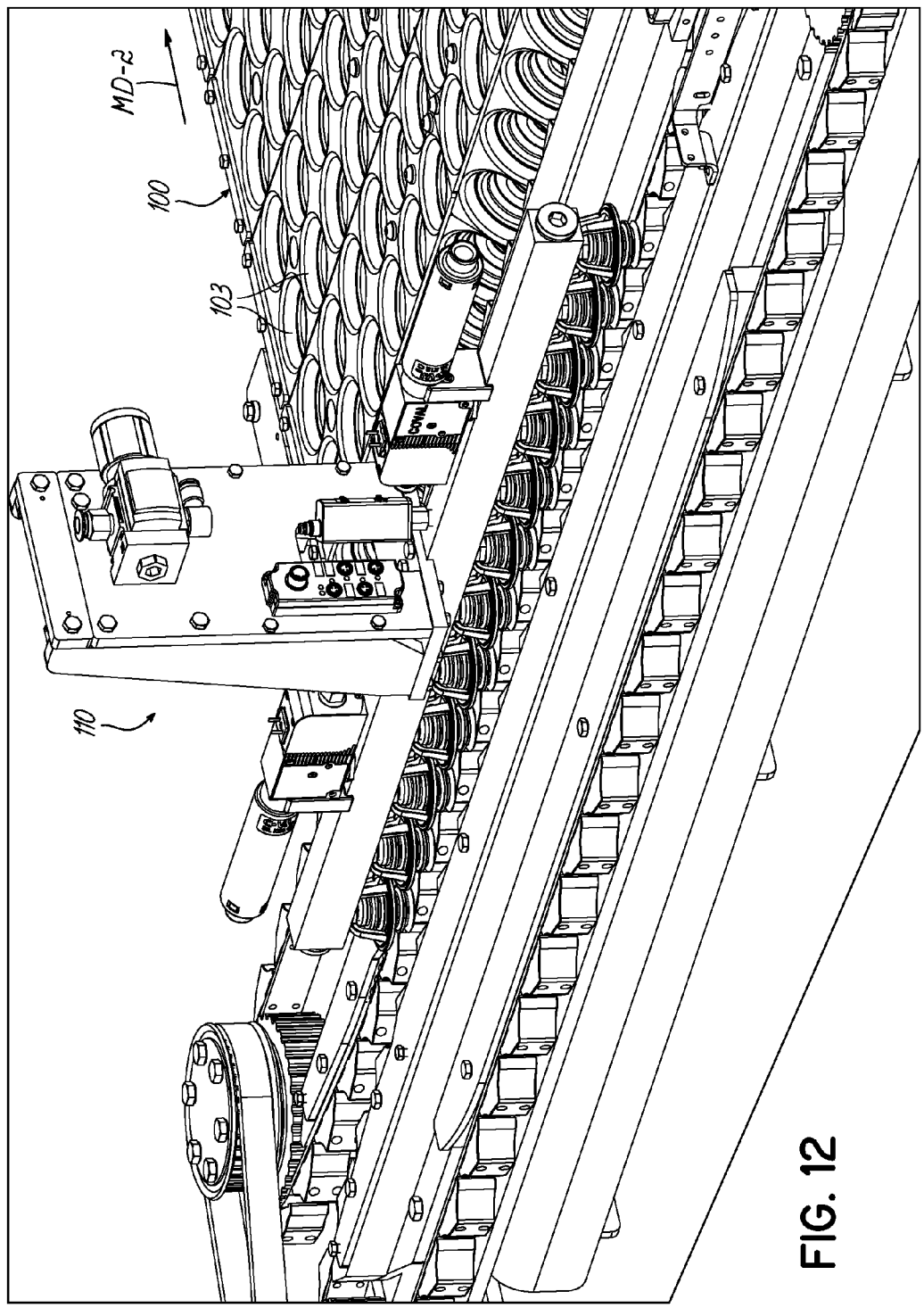
FIG. 12 is an orthographic end view of the initial picker for lifting spaced cups at pick and placing them in respective receptacles oriented in rows in a moving tray.
Figure 12A:
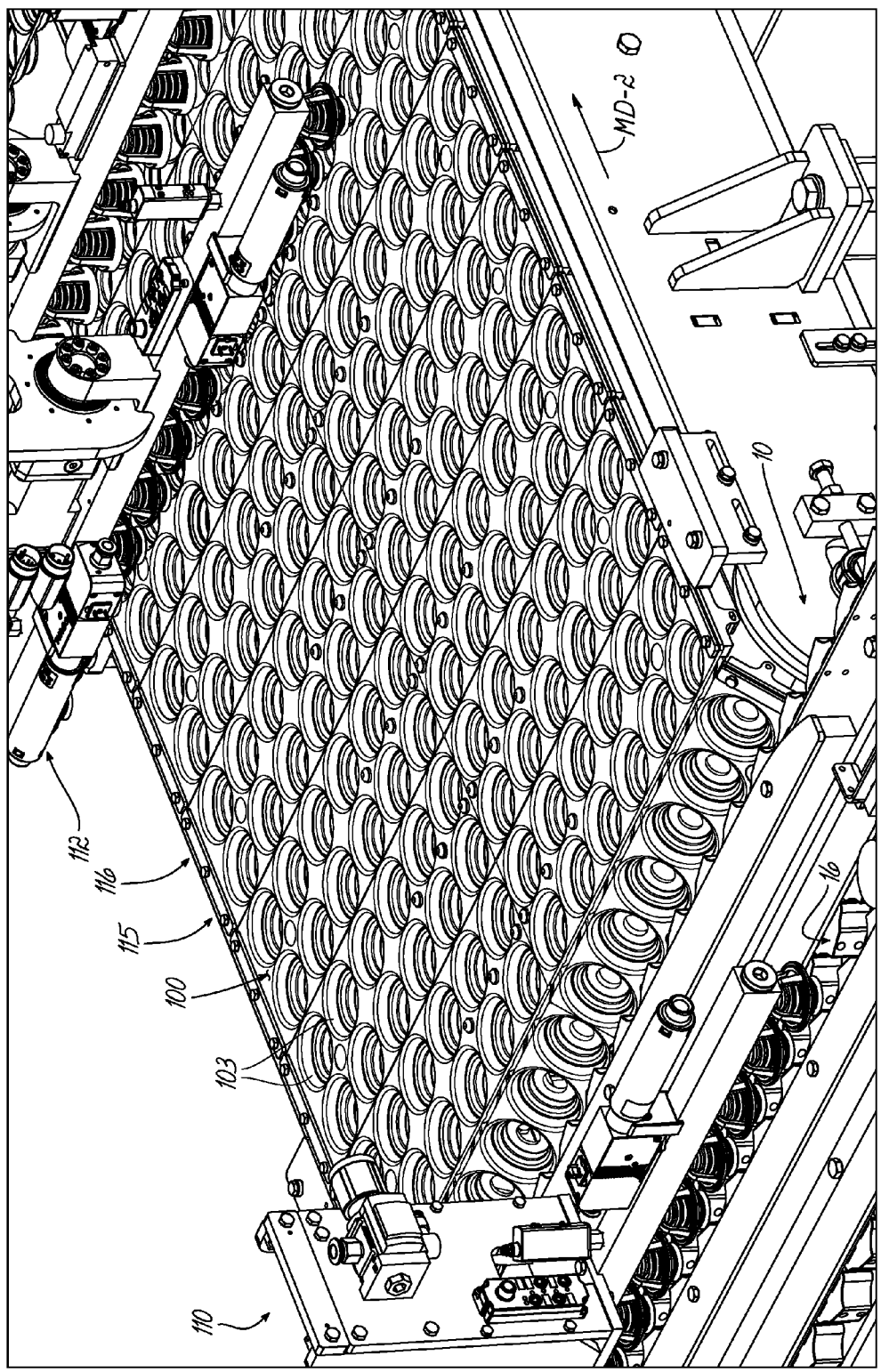
FIG. 12A is an orthographic end view of an empty tray showing the hinged tray elements of the tray conveyor.

Turning now to FIGS. 9-11, a dual lane spacing apparatus 80 is shown wherein abutting cups are introduced to apparatus 80 in two lanes 81, 82 instead of one introductory lane as in FIGS. 1-8. Two conveyors 83, 84 convey the cups toward apparatus 80.

The conveyors 83, 84 of spacing apparatus 80 comprise respective two linear stars 85, 86, which have opposed runs 87, 88, spaced apart on the outside of respective lanes 81, 82. An elongated cup guide 90 is oriented between runs 87, 88 and lanes 81, 82. Just as noted in connection with the foregoing embodiment, each linear star 85, 86 operates on one respective lane 81, 82 of cups so that each lane of cups is spaced by only one linear star, opposed by guide 90 and a respective guide surface 91, 92 (FIG. 11).

The cup rims 93, 94 are guided in respective elongated slots 95, 96 and 97, 98 formed in elongated guides, as shown, to guide and support cups in adjacent lanes.

FIG. 11 illustrates one cup C-8 with rim 93 but a sunken lid not bulging upwardly. One cup, C-9, has a bulging lid 99 but it too is effectively guided so cups of any lid configuration are reliably handled.

Lugs 16 individually form cup receiving pockets, opposed by respective guide surfaces 91, 92 to confine and hold the cups at predetermined pitch spacing similarly to the operation of the above embodiment.

Further operation is apparent from the FIGS., with the cups or containers being spaced apart by the wedging action of the lugs of a conveyor as they approach an opposed conveyor or guide.

Accordingly, two lines of spaced cups are generated in parallel and in the direction MD. Cups can be picked up simultaneously or selectively for delivery to further downstream orienting and packaging apparatus.

It will be appreciated that any suitable sensing system can be used to detect the abutting cups and spaced cups. Any incomplete line or row of spaced cups can be ejected at the end of the linear stars to prevent voids in the staging process and final packaging.

Pattern Staging:

Turning now to the downstream orienting of cups set at pitched, spaced distances in the linear stars, an overhead three axis picker or end effector is disposed over the stars, descends, picks up the spaced cups (such as 12 of them), lifts them and transports them in a second direction, perpendicularly to the machine direction over a moving tray having a multiplicity of parallel, transverse rows, such as two rows 115, 116 in linked trays 100 of cup-receiving pockets, and such as 12 receptacles in each row. Reference is made to FIGS. 12-21.

In a second aspect of the invention, then, spaced cups in a row between the linear stars are further manipulated into patterns with a final pattern, in one embodiment of 12 cups in two layers of six cups each as will be further described. One preferred package grouping has a first layer of cups with each adjacent cup inverted with respect to its neighbors. The second layer of cups is reversed such that top up cups are deposited on top down cups so their respective bottoms are engaged and such that bottom up cups are deposited on top up cups so their respective tops or lids engage. The 12 cups are thus nested together for packaging in two layers, the carton having minimal interior volume.

Of course, other final packaging groups and cup configurations can be provided and this packaging group is illustrated for clarity.

In this regard, cups in a single line defined by the linear stars are engaged and lifted into respective pockets 103 oriented in parallel rows 115, 116 in a moveable linked tray 100. The cups are re-oriented in the tray pockets, as the linked trays 100 are moved or indexed along, by a plurality of pickers or end effectors as will be described.

Figure 13:
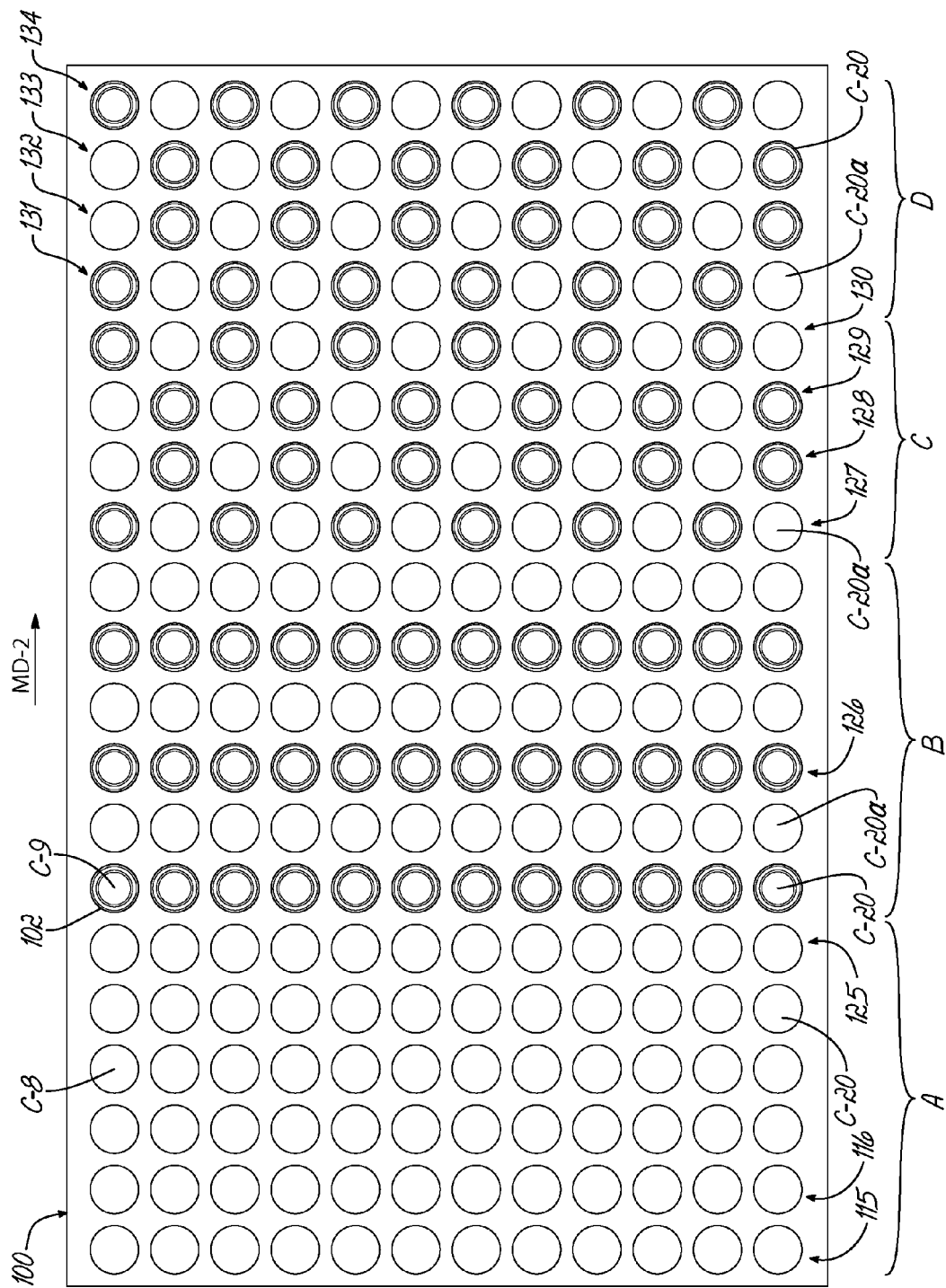
FIG. 13 is a diagrammatic plan view of a plurality of cups in transverse tray rows and illustrating the cup orientation as they are moved in a downstream direction and re-oriented for packaging.
Figure 15A:
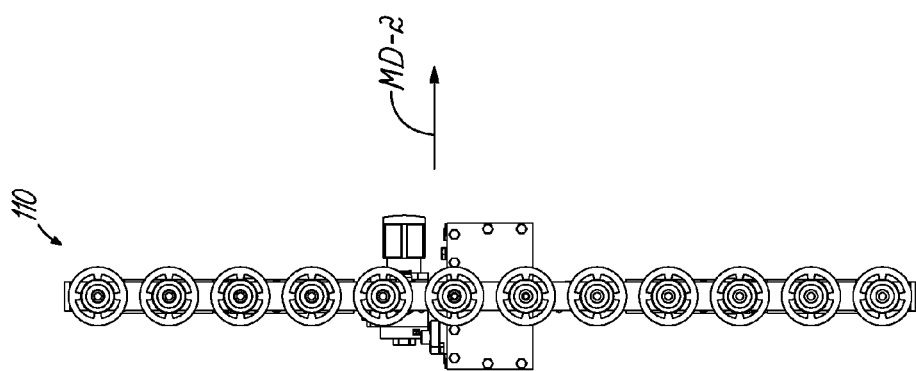
FIGS. 15A, 15B and 15C are diagrammatic top plan views of components in FIGS. 14A-14C.
Figure 14C:
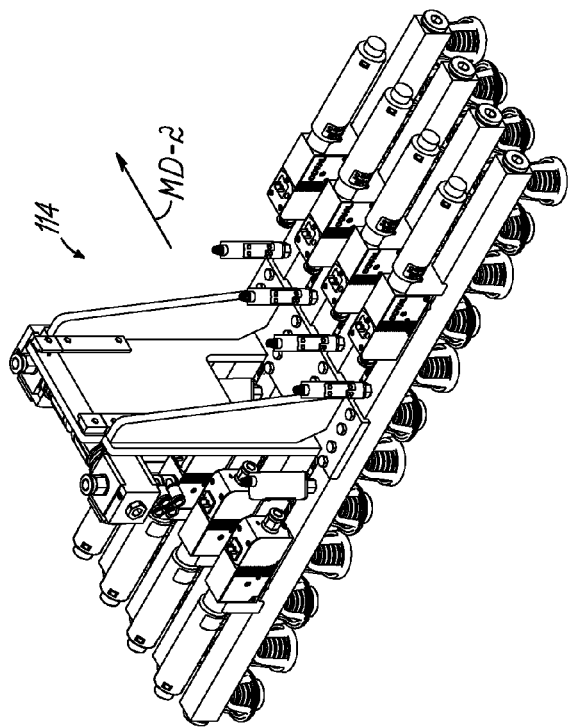
Figure 15C:
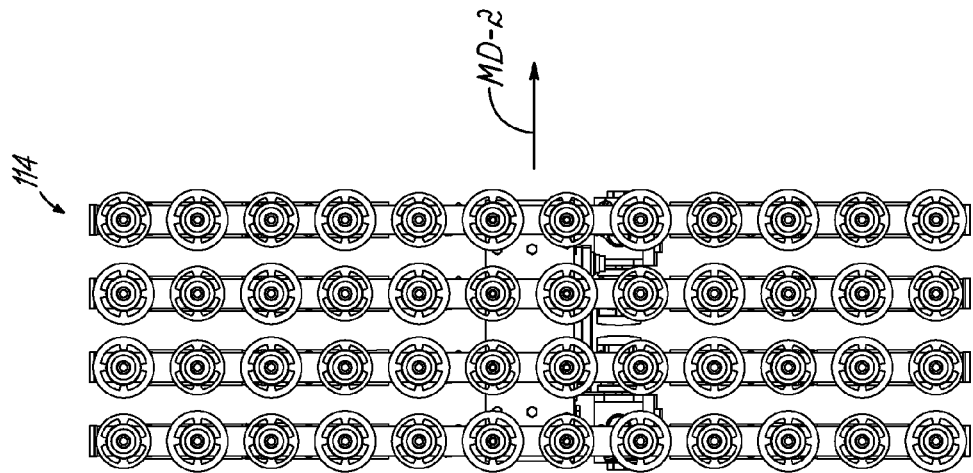
Figure 15B:
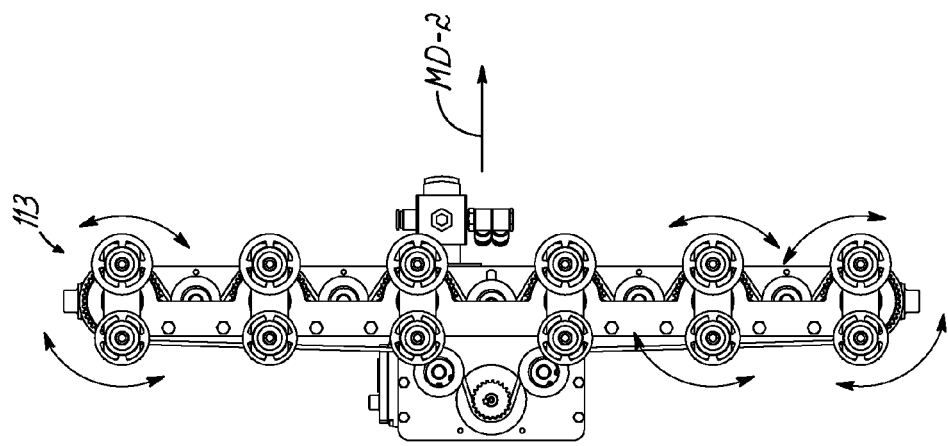
Figure 15B:
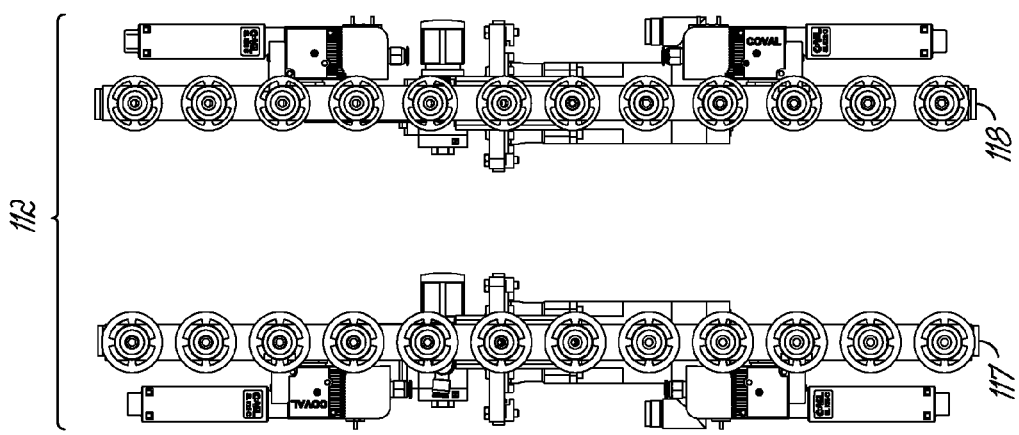
Figure 17:
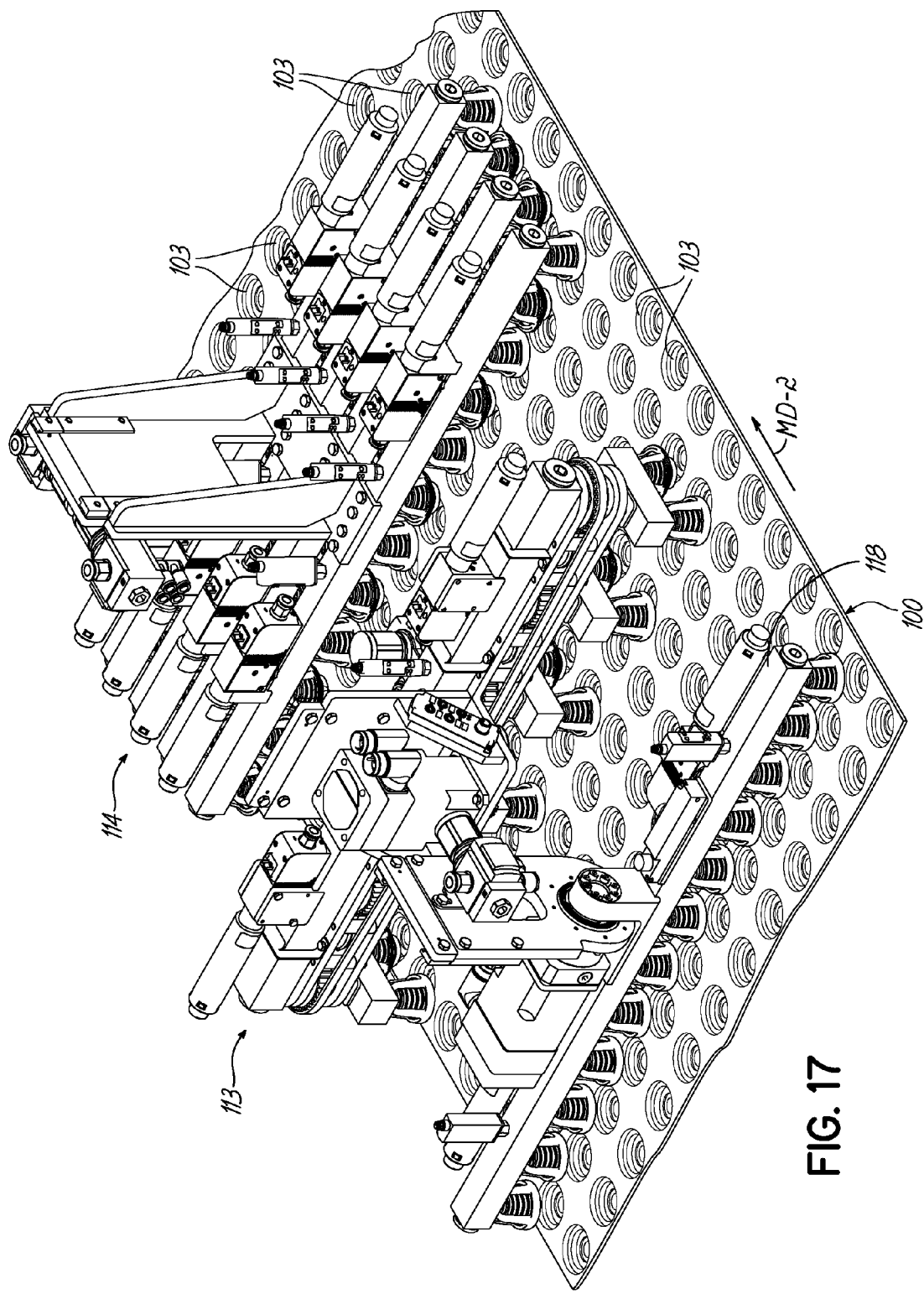
FIG. 17 is an isometric view of a portion of the cup re-orientation and transporting pickers.
Figure 18:
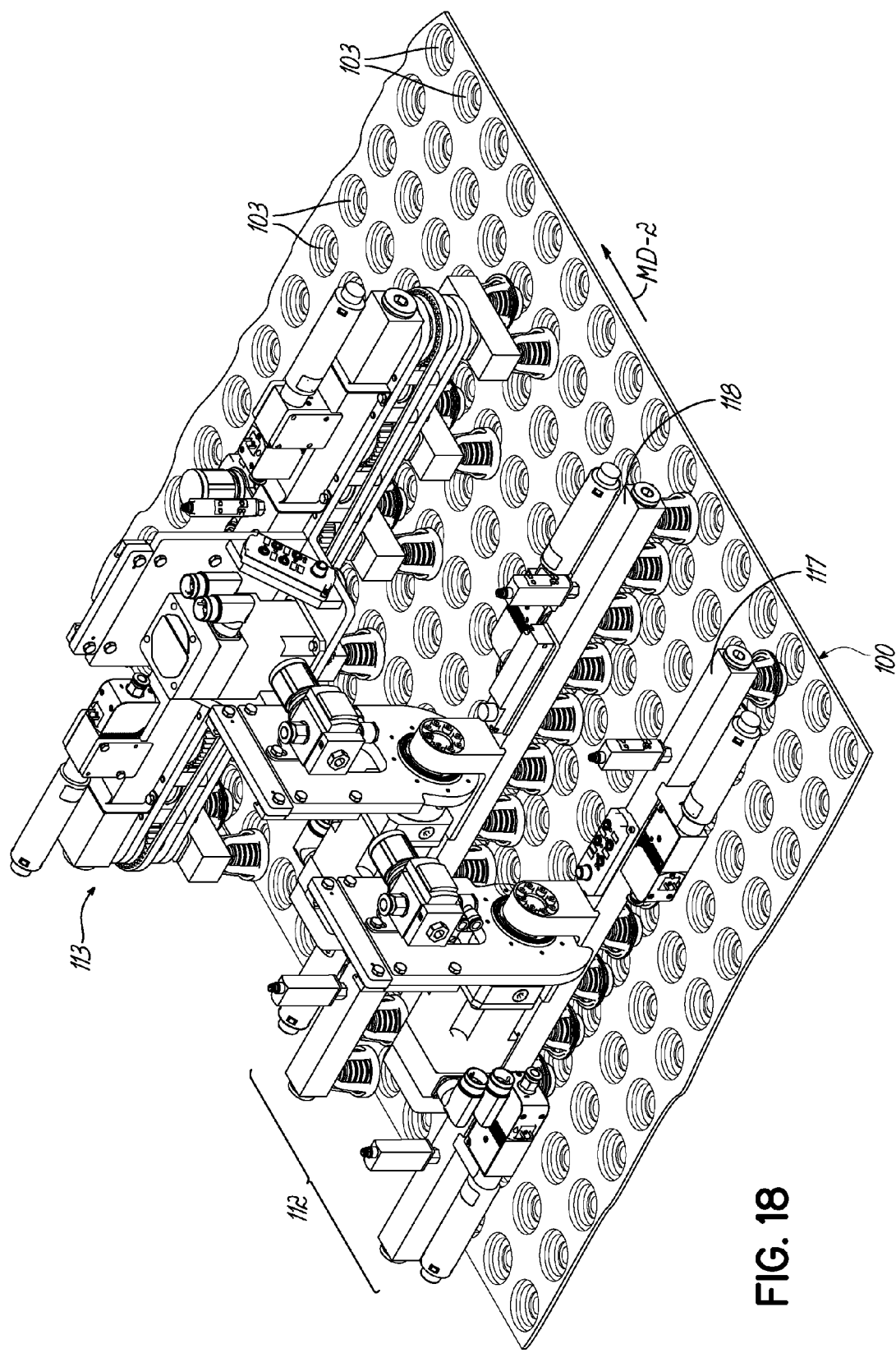
FIG. 18 is another isometric view of a portion of the cup re-orienting pickers.

Diagrammatically, the orientation of the cups in the moving tray is illustrated in FIG. 13, which shows the re-orientation of cups at various stages of the tray as it moves along. FIG. 13 shows the cup position and orientation diagrammatically, while FIGS. 12, 12A and 17-21 show photographically the overall re-orienting system.

With reference to FIG. 13, a plurality of trays 100 are configured to move in the machine direction MD-2. A tray conveyor is preferably comprised of a series of trays 100 hinged together so the trays 100 operate as a conveyor with an upper run moving in the direction of MD-2. Each individual tray link defines one or more, and preferably two, transverse rows 115, 116 of cup receiving pockets 103 which, in FIG. 13, are each filled with a cup. In FIG. 13, cups such as at C-8 are initially oriented top up. Cups such as at C-9 are illustrated downstream with their bottoms up and top rim 102 down, as further discussed.

Figure 21:
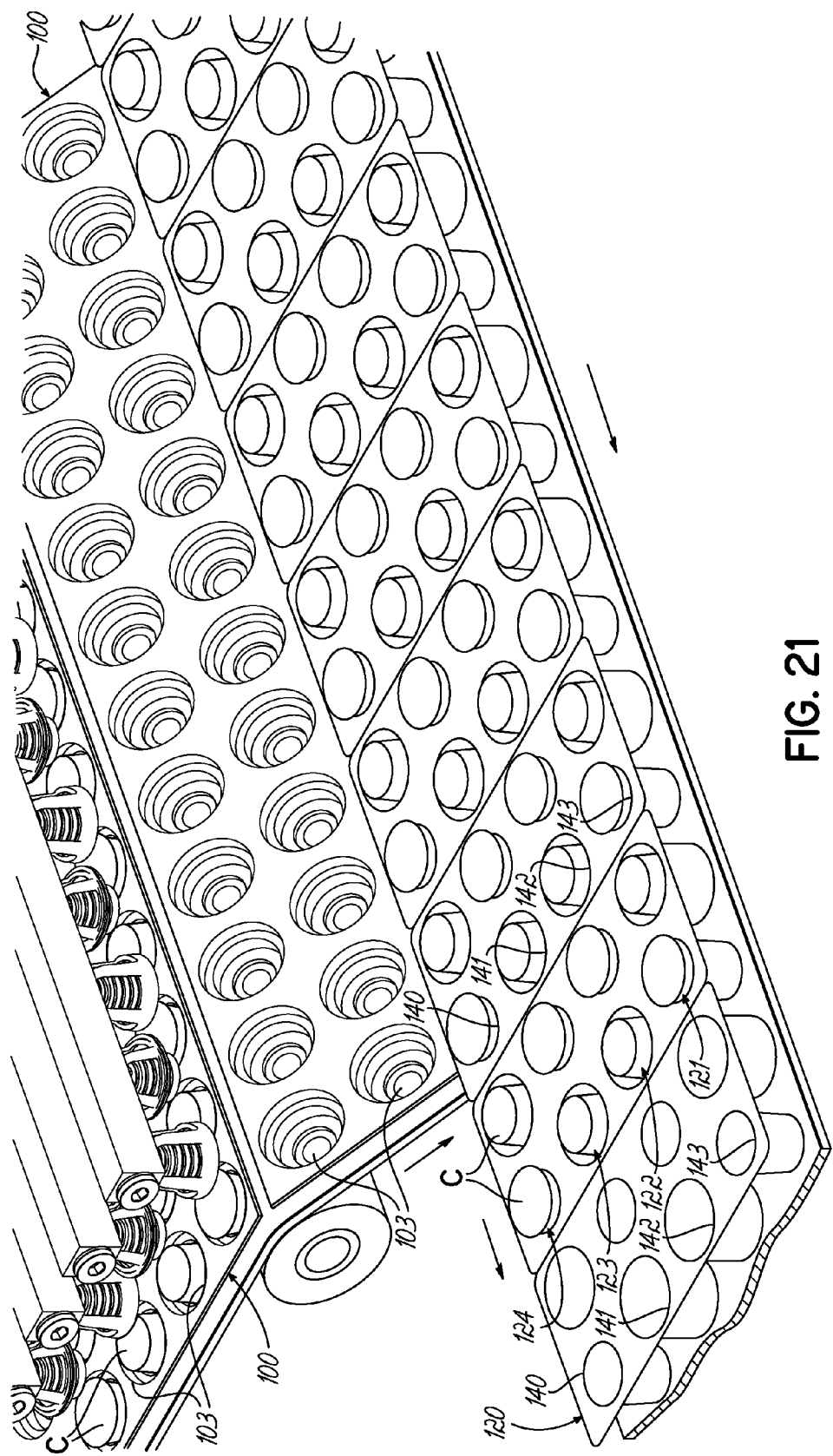
FIG. 21 is an isometric view illustrating a loading conveyor receiving cups from a transport picker and from a pattern staging tray.

FIG. 13 illustrates essentially the entire upper run of the trays 100 from loading to a downstream unload position such as represented in FIG. 21.

In FIGS. 17-21, the cups are not shown for clarity.

Returning to FIG. 13, cups such as at C-8 and C-9 are illustrated in the tray 100 to demonstrate the cup orientation as the tray 100 moves through various orientation stages from uniform disposition in the rows of Stage A to re-oriented positions in stages C and D.

Illustrated in the FIGS. are the pickers or end effectors 110-113 for re-orienting the cups in trays 100, and effector 114 for transporting selected cups to a two-lane transfer or loading conveyor 120 (FIG. 22) where the re-oriented cups are gathered into respective layers for grouping and cartoning.

Picker 110 functions to transfer a row of cups, top up, to a row of pockets 103 in a tray 100. Picker 112 functions to invert cups in alternating rows in a tray 100. Picker 113 functions to rotate cups in the same position in two adjacent rows, and picker 114 serves to lift 4 cups each from an adjacent row and deposit them on a transfer conveyor for further group forming.

Picker 110 is thus operationally correlated with Stage A, picker 112 with Stage B, picker 113 with Stage C, and picker 114 with Stage D.

Pickers 110-114 may comprise any useful end effector or apparatus for gripping or holding cups and moving them as will be described.

Picker 110 moves in a machine direction MD, lowers to engage a row of spaced cups in or between the linear stars while moving, lifts the row of engaged cups and moves in the direction MD-2 to deposit the rows of cups into pockets 103 in tray rows 115, 116 of a tray 100.

Trays 100 move in direction MD-2 to transport successive rows of cups beneath picker 112 which is comprised of two gripper racks 117, 118. Rack 117 engages the top-up cups in an alternating tray row and rotates about a transverse axis so the cups are horizontally-oriented, while rack 118 rotates in an opposite direction to grip the bottoms of cups held horizontally by rack 117. Rack 118 then reverses in rotation and places the cups top down in the same row pockets from which rack 117 removed them (with the tray 100 having been indexed in direction MD-2).

Figure 19:
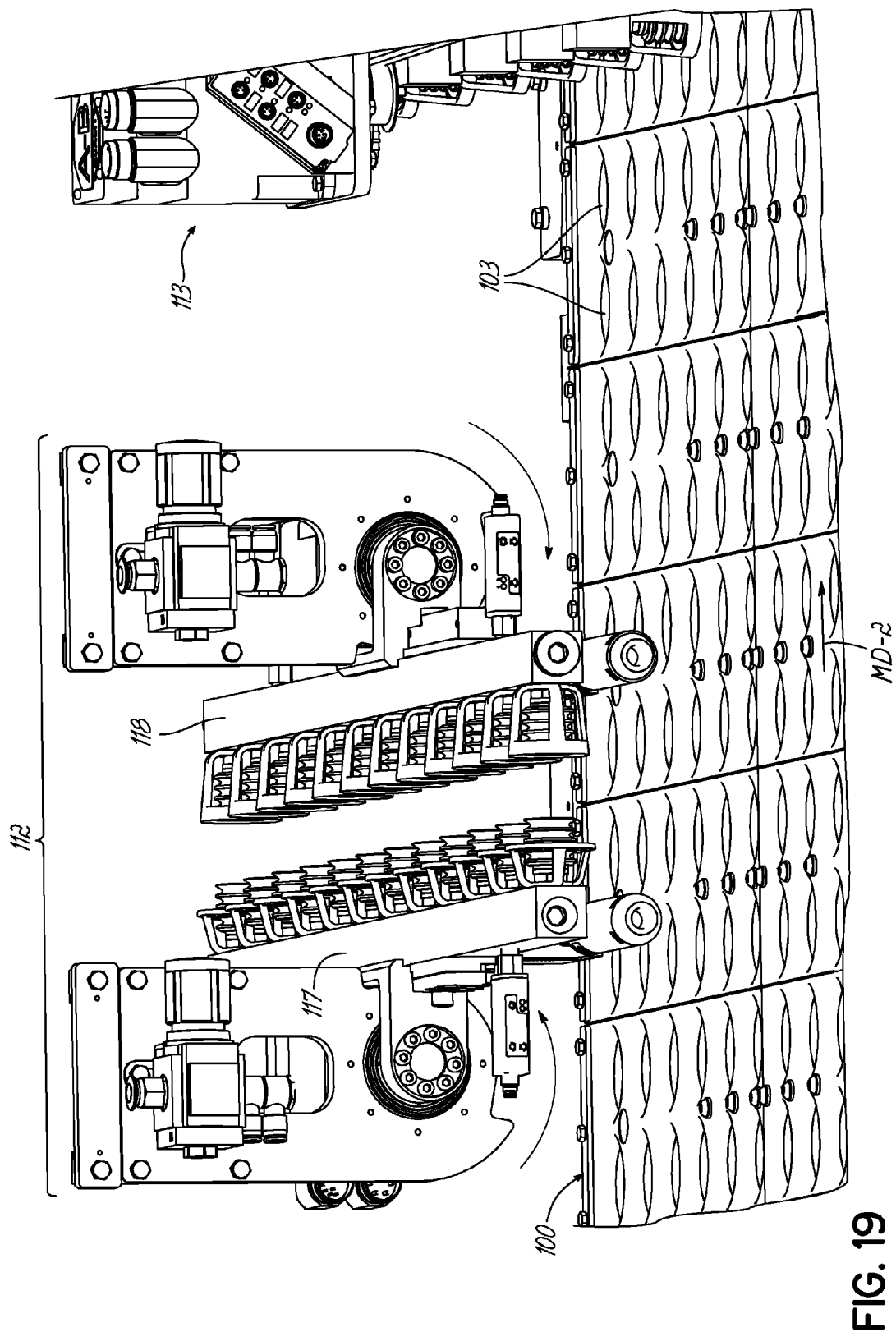
FIG. 19 is an orthographic view of the inverting picker of preceding FIGS.
Figure 20:
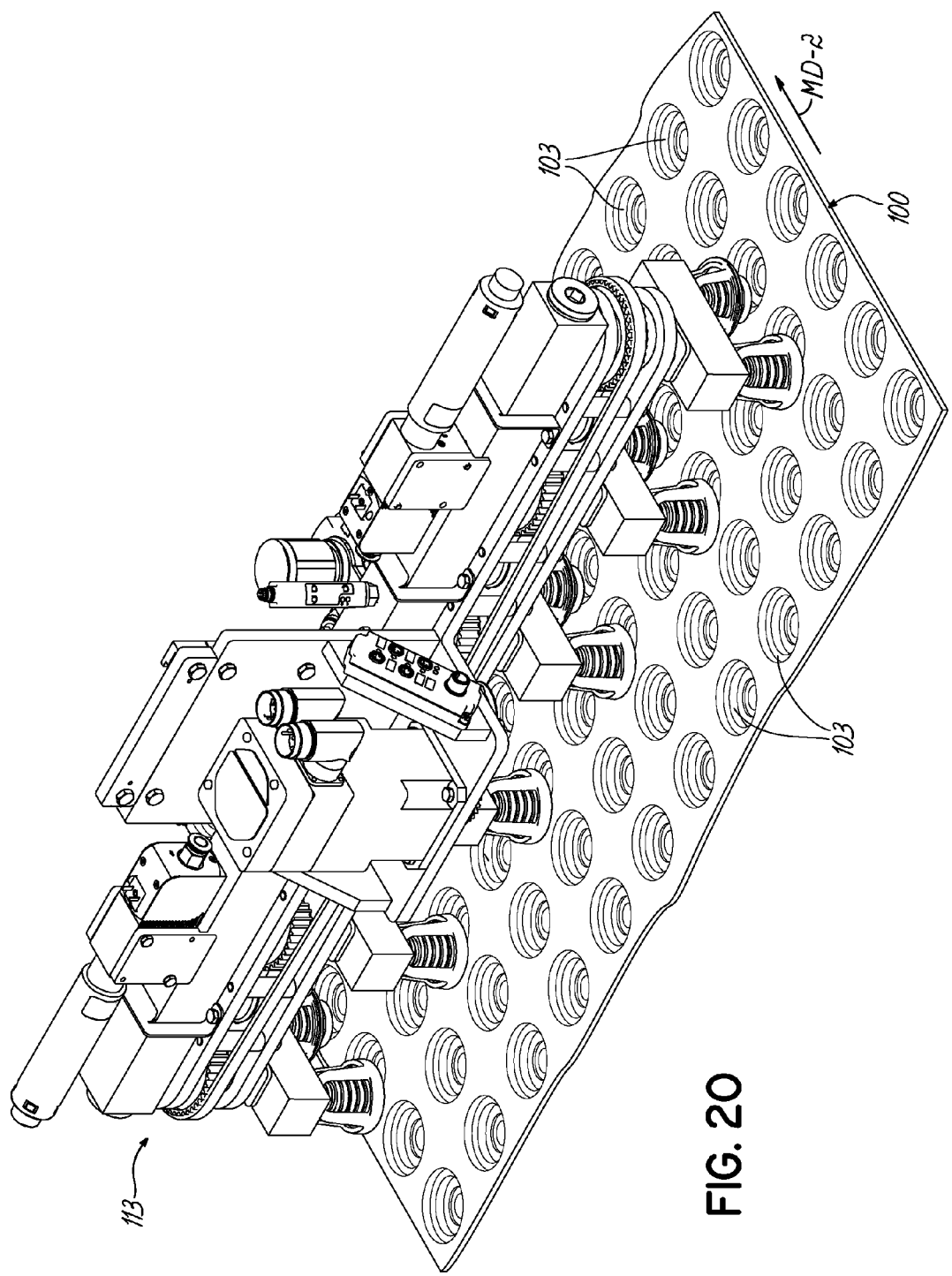
FIG. 20 is an isometric view of a rotational picker operational to reverse the cups between two rows.

The cooperating position of racks 117, 118 wherein cups are transferred from rack 117 to rack 118 is illustrated in FIG. 19.

Accordingly, cups in every other tray row are inverted, top down as shown in Stage B, FIG. 13.

Further, indexing of tray 100 in direction MD-2 brings the alternately inverted rows of cups in Stage B to position for further orientation by picker 113.

Shiftable picker 113 has a plurality of six picker heads mounted for 180 degree rotation about vertical axes as illustrated in FIG. 15. Picker 113 descends down upon every other two longitudinal rows of cups in Stage B, grips the cups in adjacent rows and rotates 180 degrees, now reversing the cups at the same position. In the two adjacent rows to achieve the orientation of cups to that of Stage C (FIG. 13). The six heads of picker 113 operate only on every other cup position in each adjacent row, such that the cup orientation of Stage C is generated. In this regard, it is appreciated the trays 100 are indexed between shifting of the picker 113 so the cup configuration is as shown in FIG. 13.

Further indexing of tray 100 carries the cups, now in Stage C, and as shown, beneath picker 114 which picks up cups in the four rows shown and transports them to a loading conveyor 120 (FIG. 21) for movement to a robot station (not shown) where the rows of cups are collapsed and the outside two rows are lifted up and placed on top of row 123, 124, forming a cup group of two layers for packaging.

For further explanation, an operation concerning cups in the first four lower (FIG. 13) positions of adjacent rows will now be considered with a "virtual" cup described as it moves through the system.

Cups C-8 reside in adjacent rows 116 in Stage A. Cups in each other row, such as a row 125 and a row 126 are inverted by picker 112 so the cups C-9 in alternate adjacent rows 125, 126 for example, are inverted to the position shown in FIG. 13, with cups in one transverse row having tops up and in alternate adjacent rows having tops down.

Thereafter, cups in the same transverse location in every other set of two rows 127, 128 are engaged by picker 113 which rotates them so the cup orientation in Stage C is reversed, as shown, picker 113 not operating on the next downstream set of two rows 129, 130, in which the cup orientation stop the same as in Stage B, but shifting perpendicularly to direction MD-2 for engaging and rotating a pair of cups so the cups are as shown at C and D in FIG. 13.

FIG. 13 illustrates the staging system for the whole length of tray 100, however, it may be illustrative to follow the progress of a single cup as it is moved and re-oriented in the direction MD-2.

A virtual cup C-20 is originally oriented top up in tray 100. Located in an alternate row, cup C-20 is inverted in Stage B. Thereafter, a cup C-20 in every other set of two rows is rotated to change places with the virtual cup C-20a. Cups in the downstream set of two rows 129, 130 are not so re-oriented. The result is the pattern of cups in the four rows 131-134 of Stage D (FIG. 13) for transport by picker 114 onto loading conveyor 120.

It will be appreciated the cups on an upper layer preferably engage the cups on the lower layer top-to-top or bottom-to-bottom respectively, as disclosed.

Turning now to FIG. 21, the loading conveyor 120 of this embodiment includes trays (which may be articulated) of an endless conveyor having four lanes of pockets 140-143 for cups in the pattern shown.

Loading conveyor 120 transports the tray with the cups to a load building station, preferably including one, two or more robots (not shown).

In the case of two robots, one will first engage the cups in the lanes having pockets 140, 141, compress or collapse the cup pattern, and deposit a layer of six cups in a carton. The second robot will then engage the cups in the lanes having pockets 142, 143, collapse that pattern, and deposit that layer of six cups in the carton on top of the first layer, for a twelve count package. Alternately, a single robot can be used for these functions.

Final cartoning is then completed.

It will be appreciated that the invention can be modified to produce a wide variety of packaging configurations, including changes in the length or orientation of the rows or lanes, changes in the cup orientation within the tray or conveyor pockets, changes in the final group or package build and the like. Carton or package builds of various counts can be attained such as 6, 10, 12, as described, 18, etc.

Moreover, it will be appreciated the invention comprises a container pitch forming apparatus wherein containers such as cups are arranged in a spaced-apart pattern at predetermined pitch, from an abutted "prime" condition where the cups (cup rims) are abutted. As an example, FIGS. 2-4 and 6-7 illustrate the cups in an abutted prime condition.

Also, while the drawings illustrate first a single cup path formed by opposed lug conveyors 12, 13 (FIG. 2) and, second, a dual lane cup conveyor where an elongated, smooth guide 90 is disposed between two lug conveyors 85, 86 (FIG. 10), the invention also contemplates a single cup path defined on one side by a guide such as guide 90, and a single lug conveyor on the other side where the lugs include a surface defining a cup receiving pocket and a ramp inclined toward that surface.

Also, it will be appreciated that the upstream end of any cup lane herein includes either a lug conveyor with the entry end tapered toward an opposed lug conveyor or guide, or a guide tapered toward a lug conveyor for receiving and feeding cups.

The respective conveyors or guides thus define a wedge in which approaching lugs of respective lug conveyors or a lug conveyor and guide function to space and locate cups in the receiving pockets of lugs.

A different plurality of pickers, conveyors and robots can be used. Dual packaging/build groups can be provided.

Cups are positively controlled throughout the system, pitched by the linear stars. The orienting or staging system can be used to handle spaced cups, however generated, and at the downstream end of the linear stars, the lugs of one conveyor move away from the lugs of an opposed conveyor or guide to facilitate any needed clean-out.

Cups are thus controlled, transported and formed for packing in one or more patterns as desired.

What is claimed is:

1. A method of creating a pattern of cups in a tray defining a plurality of transverse rows of pockets and including:
   depositing a row of cups in a row of pockets of said tray;
   inverting cups in every other of said rows, thus creating alternating rows of top up and top down cups;
   engaging a cup in each of two adjacent rows and, at the same time and location in each row and exchanging the respective engaged cups into a pocket previously occupied by the other respective cup;
   engaging cups in two sets of parallel cup rows, and transferring engaged cups for loading.

2. A method as in claim 1 including transferring engaged cups from said rows onto a loading conveyor for grouping and packaging.

3. A method as in claim 1 wherein said engaging step is applied to every other cup location on at least one of said rows.

4. A method as in claim 1 including forming two layers of cups with cups of one upper layer having their tops of top down cups engaging the tops up tops of cups the other lower layer, and the bottoms of top up cups of an upper layer engaging the bottoms of top down cups of the lower layer.

* * * * *

UNITED STATES PATENT AND TRADEMARK OFFICE
CERTIFICATE OF CORRECTION

PATENT NO. : 9,776,751 B2
APPLICATION NO. : 15/005154
DATED : October 3, 2017
INVENTOR(S) : Matthew R. Lukes et al.

It is certified that error appears in the above-identified patent and that said Letters Patent is hereby corrected as shown below:

In the Specification

Column 2, Line 14, "require" should be ---requires---.

Column 3, Line 34, after the word "shapes" insert --,--.

Column 4, Lines 24-25, "14C are an isometric diagrammatic views" should be ---14C are isometric diagrammatic views---.

Column 4, Line 51, "relate" should be ---relates---.

Column 8, Line 53, "same position. In the two" should be ---same position in the two---.

Column 9, Line 16, "stop" should be ---stops---.

In the Claims

Column 10, Lines 52-56, Claim 4, "A method as in claim 1 including forming two layers of cups with cups of one upper layer having their tops of top down cups engaging the tops up tops of cups the other lower layer, and the bottoms of top up cups of an upper layer engaging the bottoms of top down cups of the lower layer." should be ---A method as in claim 1 including forming two layers of cups with cups of one upper layer having their tops of top down cups engaging the tops of top up cups of the other lower layer, and the bottoms of top up cups of an upper layer engaging the bottoms of top down cups of the lower layer.---.

Signed and Sealed this
Twenty-fourth Day of April, 2018

Andrei Iancu
*Director of the United States Patent and Trademark Office*